(12) United States Patent
Hofman et al.

(10) Patent No.: US 8,194,913 B2
(45) Date of Patent: Jun. 5, 2012

(54) CHARACTER RECOGNITION SYSTEM AND METHOD

(75) Inventors: Yoram Hofman, Haifa (IL); Lev Nikulin, Nazareth Illit (IL)

(73) Assignee: Hi-Tech Solutions Ltd., Migdal Haemek (IL)

( * ) Notice: Subject to any disclaimer, the term of this patent is extended or adjusted under 35 U.S.C. 154(b) by 896 days.

(21) Appl. No.: 11/573,902

(22) PCT Filed: Jul. 5, 2005

(86) PCT No.: PCT/IL2005/000711
§ 371 (c)(1),
(2), (4) Date: Feb. 19, 2007

(87) PCT Pub. No.: WO2006/006149
PCT Pub. Date: Jan. 19, 2006

(65) Prior Publication Data
US 2008/0063280 A1    Mar. 13, 2008

(30) Foreign Application Priority Data
Jul. 8, 2004    (IL) ......................................... 162921

(51) Int. Cl.
*G06K 9/00* (2006.01)
*G06K 9/72* (2006.01)
*G06K 9/20* (2006.01)

(52) U.S. Cl. ........ 382/100; 382/321; 382/105; 382/103; 382/229

(58) Field of Classification Search .................. None
See application file for complete search history.

(56) References Cited

U.S. PATENT DOCUMENTS

| | | | |
|---|---|---|---|
| 5,111,289 A * | 5/1992 | Lucas et al. | 348/148 |
| 5,675,326 A * | 10/1997 | Juds et al. | 340/904 |
| 5,680,480 A * | 10/1997 | Beernink et al. | 382/187 |
| 5,809,161 A * | 9/1998 | Auty et al. | 382/104 |
| 6,298,175 B1 * | 10/2001 | Longacre et al. | 382/312 |
| 6,553,131 B1 * | 4/2003 | Neubauer et al. | 382/105 |
| 6,970,591 B1 * | 11/2005 | Lyons et al. | 382/154 |
| 7,031,553 B2 * | 4/2006 | Myers et al. | 382/289 |
| 7,365,748 B2 * | 4/2008 | Suen et al. | 345/428 |
| 7,587,068 B1 * | 9/2009 | Steinberg et al. | 382/118 |
| 2002/0051575 A1 * | 5/2002 | Myers et al. | 382/202 |
| 2002/0065657 A1 * | 5/2002 | Reding et al. | 704/246 |
| 2002/0130953 A1 * | 9/2002 | Riconda et al. | 348/115 |
| 2003/0042304 A1 * | 3/2003 | Knowles et al. | 235/384 |
| 2004/0218804 A1 * | 11/2004 | Affleck et al. | 382/141 |
| 2004/0240711 A1 * | 12/2004 | Hamza et al. | 382/118 |
| 2004/0252193 A1 * | 12/2004 | Higgins | 348/149 |
| 2005/0012636 A1 * | 1/2005 | Gallagher et al. | 340/815.45 |
| 2005/0046584 A1 * | 3/2005 | Breed | 340/825.72 |
| 2005/0099319 A1 * | 5/2005 | Hutchison et al. | 340/908 |
| 2005/0180632 A1 * | 8/2005 | Aradhye et al. | 382/182 |
| 2005/0201442 A1 * | 9/2005 | Luo et al. | 372/69 |
| 2005/0285953 A1 * | 12/2005 | Hasegawa et al. | 348/239 |

(Continued)

*Primary Examiner* — Chan S Park
*Assistant Examiner* — Avinash J Yentrapati
(74) *Attorney, Agent, or Firm* — Leason Ellis LLP; Ariel Reinitz

(57) ABSTRACT

A system and method, which enables precise identification of characters contained in vehicle license plates, container I.D, chassis I.D, aircraft serial number and other such identification markings. The system can process these identified characters and operate devices, such as access control (126) operations, traffic systems and vehicle (20) and container tracking and management (170) systems, and provide records of all markings together with their images.

34 Claims, 20 Drawing Sheets

U.S. PATENT DOCUMENTS

| | | | |
|---|---|---|---|
| 2006/0007346 A1* | 1/2006 | Nakamura et al. | 348/362 |
| 2006/0030985 A1* | 2/2006 | Lawida et al. | 701/35 |
| 2006/0104480 A1* | 5/2006 | Fleisher | 382/103 |
| 2007/0188370 A1* | 8/2007 | Coward et al. | 342/22 |
| 2007/0247089 A1* | 10/2007 | Summerland | 315/308 |
| 2008/0101726 A1* | 5/2008 | Myers et al. | 382/289 |

* cited by examiner

B86-ABC-123

FIG. 4a

886-ABC-123

FIG. 4b

*B86-ABC-123*

FIG. 4c

B86-ABC-123

FIG. 4d

B86-ABC-123

FIG. 4e

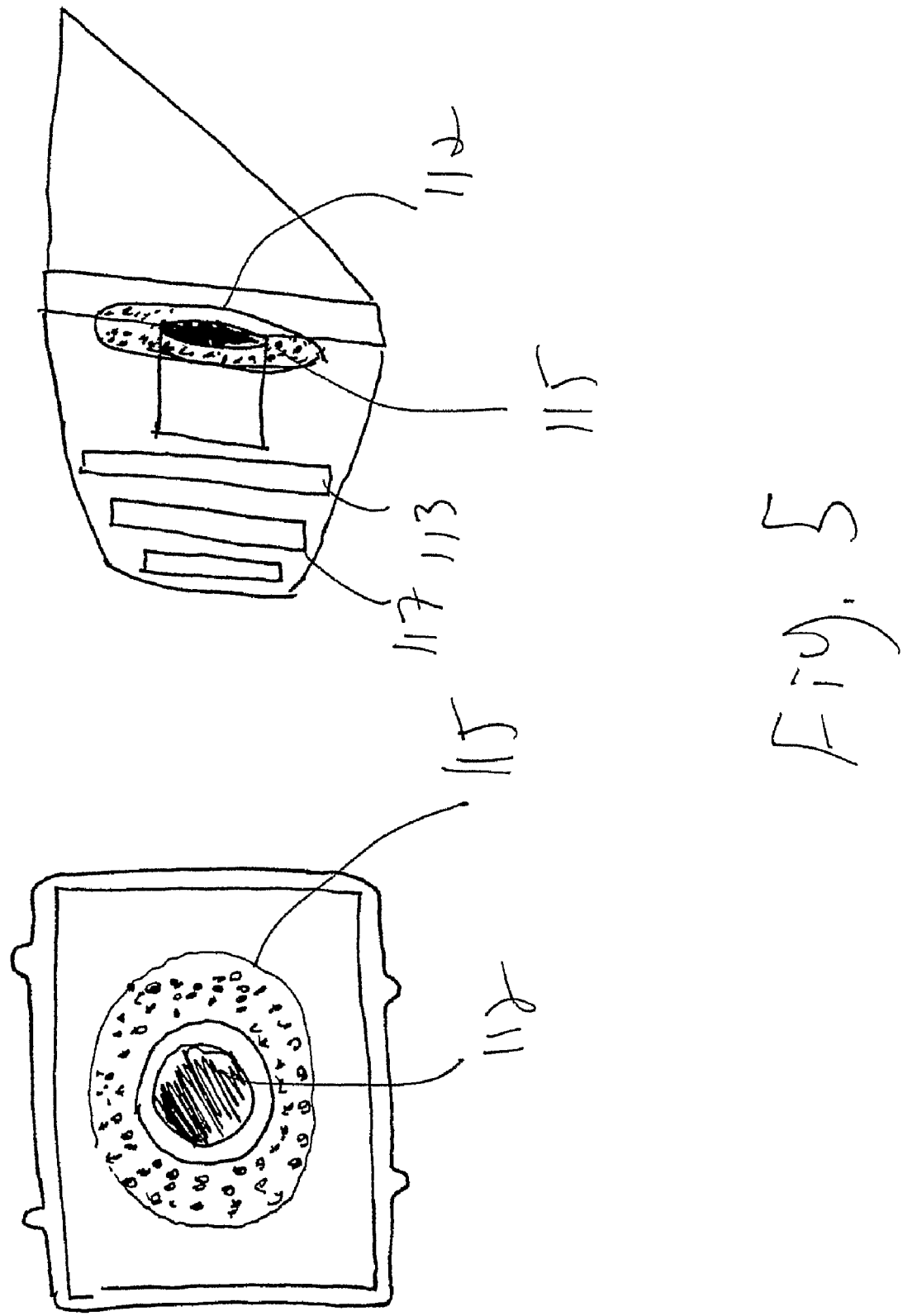

CHARACTER RECOGNITION SYSTEM AND METHOD

FIELD OF THE INVENTION

The present invention relates generally to a system and method for capturing images and providing automatic characters recognition and processing. More specifically, the present invention relates to an efficient multi-functional universal system and method based on automatic real-time, multi-step identification of characters defining object I.D.

BACKGROUND OF THE INVENTION

Vehicle traffic and cargo containers transport are undergoing a significant growth rate worldwide (about 10-15% per year). Current security supervision run by both private companies and port authorities is unable to provide a system that will enable efficient traffic control and monitoring in face of the continuing growth. Automation has a major role to play in supporting the efficient handling and capacity required for meeting the growth in container trade.

In accordance with the growing numbers of containers entering ports and crossing state borders there is a rising demand for a better surveillance system to monitor incoming and outgoing traffic. The need is voiced in both the private and public sectors. The need is apparent for systems that can efficiently and automatically identify various data such as license plate numbers, personal identification badges, incoming package or mail labels and other various data which appears in number code or other form of alphanumeric characters. Automated check and inspection gateways operation of this magnitude and sophistication is still not utilized in either factories, public companies and organizations or households today.

Many traffic environments today already employ various levels of automation, including sophisticated traffic management systems for vehicular traffic and terminal operating systems( TOS) for container movement and inventory management.

The automated system described herein include three main Sub-systems:
1. Image-capturing units, (including illumination devices),
2. A software recognition engine, and
3. System application programs The image-capturing units must include an optical and illumination effective method able to produce images of a container ID number and/or license plate number with sufficient quality, (focus, resolution, contrast, and uniformity), under all operating and ambience conditions, (sunlight, sun glare, night time, adverse weather conditions). The software recognition engine and application programs must be able to process these images and convert them into data for real-time processing.

The hardware and software must operate in unison, and be able to read the container and vehicle numbers accurately while they are passing through a gate lane, being lifted or lowered by a container crane, sitting on a chassis slot or handled by other container handling equipment. The design and selection of the image-capturing and software systems has a great impact on the system infrastructure requirements, determining mounting position and constraints for the cameras and illuminators as well as triggering requirements and solutions.

The above applications fail to disclose or teach at least the following:
1. How to achieve and decipher complete credible identification of data received by the system.
2. These applications approach each application separately and do not describe one whole operative system which will provide an effective solution to the need of such a system in a variety of work places and areas.
3. How to carry out a system self check process without outside interference to assess credibility of data analysis.
4. OCR systems, which these applications are based upon, have further developed and the demand for an expanded system which will answer the need of many and be able to carry out a variety of functions is increasing, these applications do not supply such answer as needed.

Thus, there is a demonstrated need for a character recognition system that is capable of providing accurate and precise identification on site, unaffected by outside condition such as weather and visibility, and provides reliable and verifiable results.

Furthermore, there is a need for a multi-functional universal system that will provide character identification in a wide variety of fields with the same success.

Additionally, the system must be able to perform self-testing and data verification to ensure reliable and repeatable data.

The system architecture must be optimized and designed for OCR. Existing recognition systems and method are based on high resolution and/or line scan cameras to capture OCR images, as a result these system generate data that is not always reliable and accurate. In addition these systems are complex, not easy to operate and great energy consumers.

The system should be based on components, which are modular with custom-built features for maximum integration, for example lower power consumption, and computer-system control.

The system should be able to answer individual needs and demands, and offer information that is both accurate and easily and cheaply accessible.

SUMMARY OF THE INVENTION

Thus the present invention has the following as its objectives, although the following is not exhaustive.

It is an object of the present invention to provide a method and system for identifying alphanumeric codes based on multi-level image processing algorithm. This will enable the most accurate and fast identification of alpha numeric characters based on simultaneous area scans of images.

It is a further object of the present invention to provide a method and system for increased reliability that should achieve highly accurate results regardless of weather and lighting conditions and will provide credible identification in any place, at hour of the day year round.

It is a further object of the present invention to provide a method and system that will be adjustable and easy to tailor to answer the needs of many business enterprises and provide a solution for a wide range of facilities where fast, reliable identification is necessary.

It is a further object of the present invention to provide a method and system that is both highly credible yet easy to operate and does not require expensive hardware and sophisticated computer system to operate under.

It is a further object of the present invention to provide a method and system which is easy to maintain and can operate automatically without the need for human supervision and surveillance.

It is a further objective of the present invention to provide a method and a system that can read license plate numbers, container I.D marking, chassis I.D marking, aircraft serial numbers etc. After identification and verification the system should be able to automatically operate consequent action such as gate opening or closing, alerting relevant surveillance or security systems and sending identification logs to remote clients.

It is a further objective of the present invention to enable operation of this system in all sea or land ports and important border and access destinations without the need for any major changes in the operation and management of these facilities.

Yet a further object of the present invention is to provide a system that is easy to assemble and operate, does not require a large space of operation and is comprised of a small number of parts and does not require much energy for operation.

Still a further object of the present invention is to provide a system capable of self-check and data verification, capable of error alert if such occur and with the capability of error fixing and removal. The system should be able to create data bases of relative data and present them according to the client specific demands.

These objectives and others not mentioned hereinabove are all accomplished by the system and method of the present invention, which comprises a number of sensors, cameras with synchronized illumination systems and a multi-level identification program.

The camera and illumination systems are operated whenever an object bearing alphanumeric code requiring identification enters the sensor field. The camera then focuses on the object and images are captured, from different angles and zoom positions. Different types of exposures and different illumination spectrums, are employed in order to achieve the best lighting parameters possible.

The images can be recorded while the object is on the move, up to object speeds suitable for the intended applications. The images are immediately transferred on to the deciphering program capable of isolating and identifying the relevant code required. The camera unit continues to capture images as required until the code has been deciphered.

The identified number code (number of strings and images) are displayed on the system's main display, and logged in its local database. Once a code has been recorded it can be used for several applications such as automatic log recording, in conjunction with a security system to limit access or open gates and portals, it can be sent online or using wireless technology to computer terminals or cell phones as necessary.

The data stored on the system memory and/or media is useful for maintenance, operation review and installation of different applications such as limited access doorways and gates, providing both identification and log recording of movement within the monitored zone. This type of information management is highly valuable at port terminals and vehicle parking establishments.

BRIEF DESCRIPTION OF THE FIGURES

The following detailed description of exemplary embodiments of the present invention can best be understood by reference to the accompanying drawings, in which:

FIG. 5 illustrates an Image capturing unit according to some embodiment of the present invention.

DETAILED DESCRIPTION OF THE INVENTION

Figure 1:
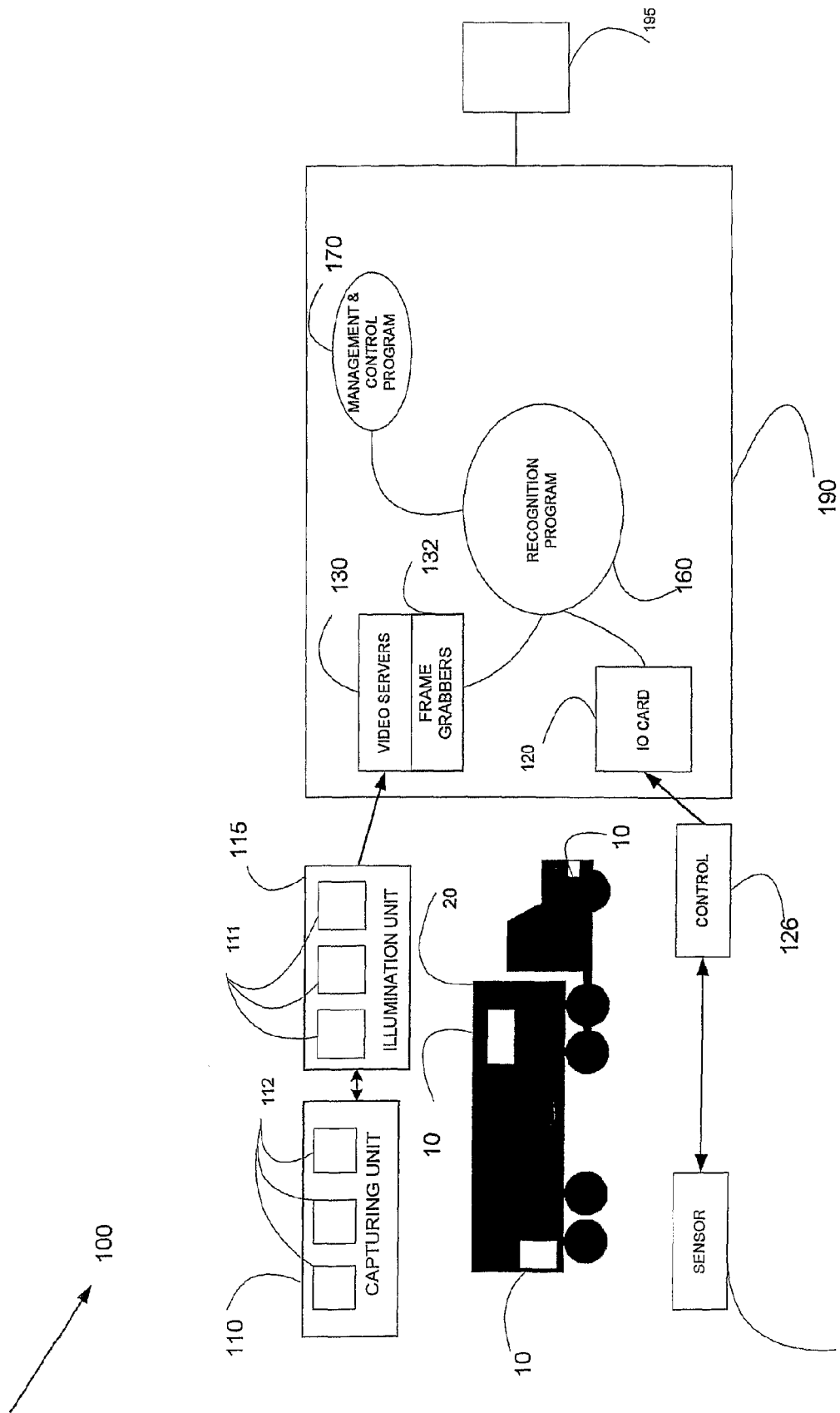
FIG. 1 is a shows a schematic illustration of a recognition system according to one embodiment of the invention.

FIG. 1 illustrates different parts of an optical character recognition system (OCRS) 100. OCRS 100 combines hardware and software compartments, providing a fast and highly reliable method of capturing and deciphering target images 10. Target image 10, defines a recorded image containing the characters OCRS is required to decipher and record. The characters can be any type of alphanumeric code and be placed at different places, such as license plate, chassis body or side of a container.

OCRS 100 is comprised of the following Hardware parts: Image capturing unit 110—including several cameras 112 the number of which varies according to the specific application (i.e. vehicle access-control system and other systems as will be described in FIG. 6-14) The position and operation of the cameras are also adjustable depending on the specific application. The image capturing unit provides the system with fast and accurate images to process.

The ability to perform a highly accurate identification is extended as several images are captured from different angles and with different exposure. Each image is processed separately until complete identification is established. The images undergo adjustment and enhancement to ensure complete reliability, as will be explained in detail in FIG. 3.

Illumination unit 115—includes several means of solid-state illumination, required to provide sufficient lighting conditions to enable high quality image capture. The position of illumination subunits, and the level of illumination provided offer a wide range of adjustable lighting conditions adequate for different conditions and requirements. Under this range, target images can be produced in adverse weather and illumination conditions, day or night. The illumination unit 115 is most important as insufficient lighting greatly reduces the chances of achieving reliable code identification. Old fashioned illumination systems are often inadequate, require expensive hardware and consume vast amounts of energy. Solid-state illumination system used in this design was planned to answer specific needs, and is energy conserving as it only operates under program requirements and in correspondence with other OCRS units. The specific operation and integration of the illumination unit will be explained in detail in FIG. 5.

Video servers units 130—for capturing camera 112 images and convert them to data. This unit can also record the data on its internal memory, and transmit it as compressed data packets over IP. Video servers units include serial command in/out used for controlling cameras. Some video servers include high transform link such as USB or camera-link.

Frame grabbers 132—receives video signals from Image capturing unit 110 and transmits them, as an array of image pixel bytes to recognition application 160.

The entire process of identification, which usually requires highly sophisticated hardware, can be performed on common PC modules. That is due to the program use of an algorithm that is relatively of low complexity as will be further detailed below.

Figure 6:
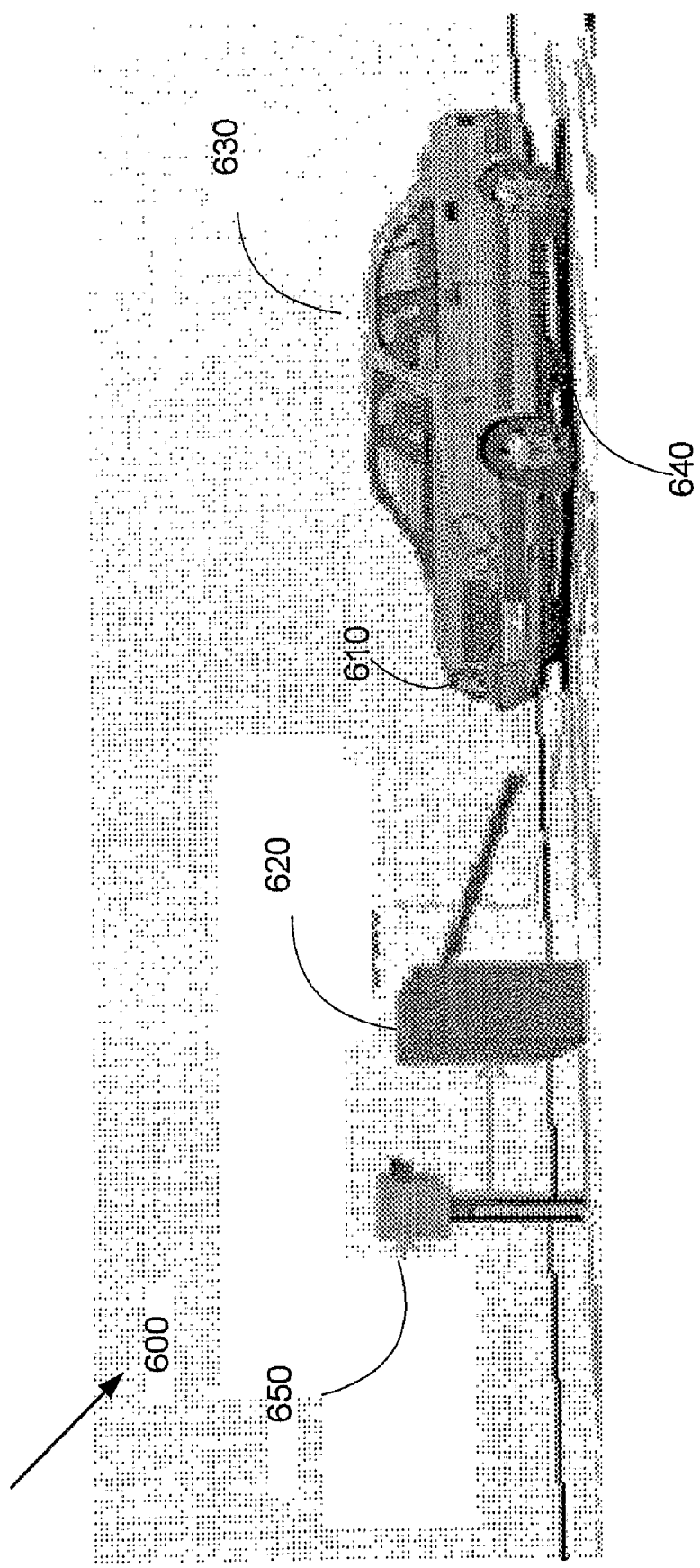
FIG. 6 shows a stand-alone Vehicle Access-Control System according to some embodiment of the present invention.

I/O card 120 main purpose is—1) to deliver sensor 125 alerts, to the processing units 2) to alert the processing unit when an object enters the relevant zone 2) to activate predefined illumination level 3) activate gate (as shown in FIG. 6).

Sensor unit 125—includes a number of sensors placed in different location whose:

OCRS 100 employs the following software:

Recognition application 160—an algorithm based program that activates recognition process 200. Identification process includes: receiving images from the video servers units, deciphering the relevant data, and identify target image 10.

Recognition process 200 is limited to small specific areas within the image and not the entire capture. This fact highly increase the efficiency as well as time and energy saving. recognition application 160 selects areas most likely to contain the target code and recognition process 200 is limited to these areas.

Different types of programs exist tailored to meet specific requirements and identify several types of objects. For example programs exist suited to identify vehicle license plates ( license identification program), Aircraft tail numbers (plane identification program) etc. a detailed explanation of Recognition application 160 will be described in FIG. 3.

Management OCRS program (MCP) 170—for controlling OCRS 100. MCP 170 manages the OCRS operation and is responsible for saving and transferring the identified codes to client application.

MCP 170—updates management workstation 190 on target object situation 20. For example management workstation 190 can be port workstation receiving current updates regarding specific crane status.

It should be noted that both software and hardware use, as described above, varies in accordance with the demands of each specific identification system (as will be detailed later on in FIG. 6-13). For example some identification system employ video server units 130 while others employ frame grabbers 132.

Figure 2:
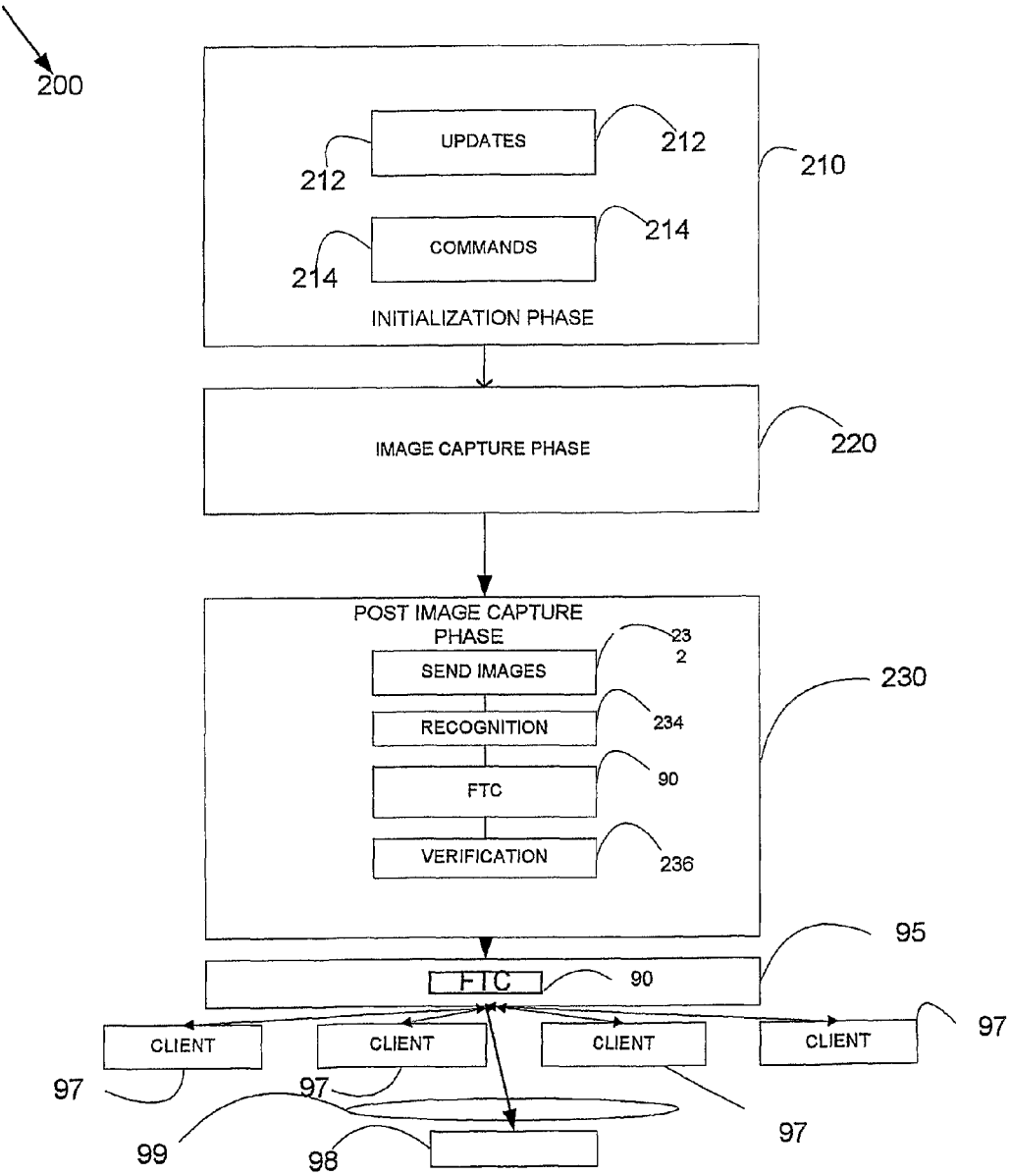
FIG. 2. shows a flow chart detailing the stages of OCRS recognition process in accordance with an exemplary embodiment of the present invention.

FIG. 2. shows a flow -chart detailing the stages of OCRS 100 recognition process 200. Recognition process 200 includes 3 phases: Initialization phase 210, image capture phase 220, and post image capture phase 230.

Initialization phase 210 includes two steps;

In the first step updates 212 are made to OCRS 100. These updates include data, which might be useful in the process to follow (for example car licenses numbers of authorized cars etc.). The update data is transferred and saved by the recognition program.

In the next step, commands 214 are optionally transferred from the video serial link to the relevant cameras 112 to perform focus and zoom functions on target object 20, and activate illumination unit 115. Commands 214 are delivered upon target object 20 entry to detection zone 30. It should be mentioned that commands 214 step, is activated only by some OCRS 100, for example TCCRS.

Target object 20 is defined as the object, which includes the target image 10. A vehicle, for example, is a target object containing a license plate which is target image 10.

Detection zone 30—defined as the area directly in front of the capture zone 40.

Capture zone 40—defined as the OCRS 100 field of view, within which the camera devices 112 are capable of detecting and capturing the target image 10.

At the end of the initialization phase the system is ready to start the image capture phase 220.

Entry of target object to capture zone 40 triggers software and hardware units, e.g. recognition application 160 and several sensors 125 are correspondingly activated.

Each sensor 125 activated, sends a signal via 10 card 120 to the recognition application 160. The signals received alert the system to the object presence within capture zone 40.

Once recognition application 160 receives sensors 125 signals, the image capture phase begins. Different cameras 112 take several shots from different angles and positions and under different illumination levels. The number of images, illumination level, capturing angle, illumination spectrum and exposure levels are all pre determined according to the specific target object 20 requiring identification. The number of images and illumination levels differ, for example, when taking a picture of a car license plate on a clear day or taking a picture at night.

Post image capture phase 230 begin once target object 20 has left capture zone 40, or after a pre determined period set by recognition application 160.

Post image capture phase includes the following steps:

The images are extracted and sent 232 to recognition application 160 for target code identification.

Once recognition application 160 has deciphered and identified the code within each image OCRS 100 operates recognition process 234 that analyzes the results generated for each image, and compare them. The most accurate result is selected, using identification algorithm (will be described in detailed in FIG. 4) that compare and finalizes the data generated.

At the end of identification process final result=Final Target Code (FTC) 90 is received.

A process of logic verification and validation 236 is generated to verify the reliability of the resulting target code.

FTC 90 is saved and presented by OCRS 100 as DDE (Dynamic Data Exchange) message 95, or alternatively by some other inter-application communication protocol, such as DCOM, or TCP/IP socket service. DDE message 95 is defined as the end result output, which includes information as required by specific client 97, such as serial number recorded, date and time. Client 97 can save the DDE message or transfer the data to a log file. Additional client application 98 can also use the message information for other purposes. A windows mechanism, "DDE Share", can also spread the message through network 99 to remote central processors and databases. Other mechanism are also available to speed the result, such as transmitting TCP/IP packets with the recognition results.

Figure 3:
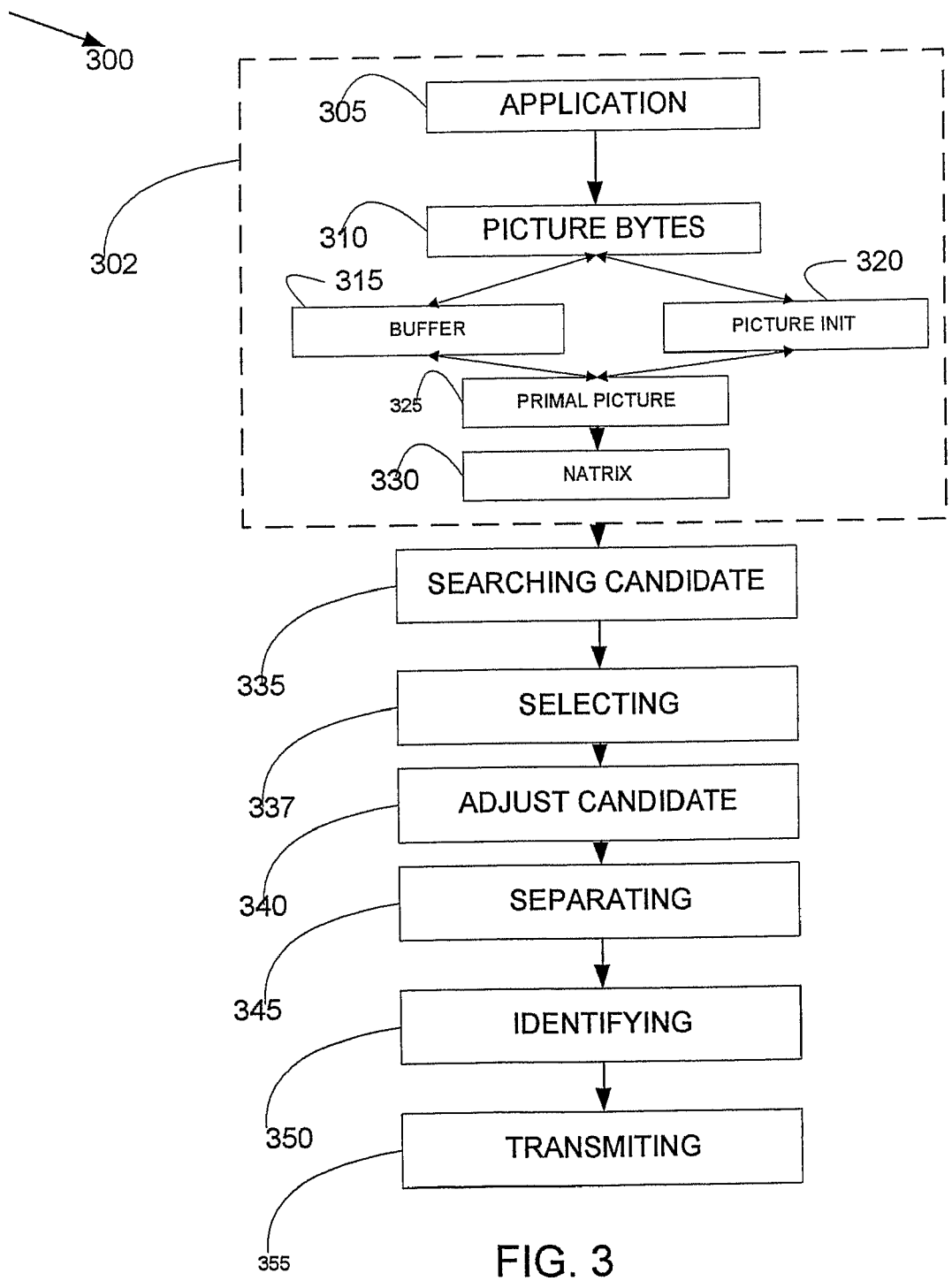
FIG. 3 depicts a flow chart illustrating the stages of identification algorithm according to some embodiment of the present invention; and In FIG. 4a-e illustrates different recognition code results according to some embodiment of the present invention.

With reference to FIG. 3, a flow chart 300 illustrating the stages of recognition algorithm is shown. Recognition application 160 activates a multi-level recognition algorithm for every target image 10, separately.

Target image 10 is stored in a string type buffer 315 on which the deciphering will be carried out. Apart from buffer 315, recognition application 160 includes relevant files, stored in picture init file 320 with information and parameters pertaining to recognition process and command instructions that describe the format of target image 10.

Once initial image 325 has been stored and buffered the following occurs:
1. matrix 330 is constructed, based on target image and several image options according to buffer 315 information and the original file received 320.
2. searching 335 candidate areas in target image 10. Candidates areas are areas in target image with greater probability of containing FTC 90.
3. Selecting 337 the target area out of the potential areas pre-selected before.
4. Adjusting 340 and improving candidate areas which includes separating characters, in candidates areas from the surrounding layers and removing other unnecessary noise elements. This process is carried out by high pass filtering function, and other algorithms.
5. Separating 345 selected characters and examining each, separately.
6. Identifying 350 and verifying each character utilizing various control and standards procedures.
7. transmitting 355 FTC 90 to recognition application database.

With reference to FIG. 4*a-e* results of target code identification are shown. As explained before, the success of the identification requires for several images to be taken with different capture parameters. The logic behind this requirement translates into the following equation:

Error of 3 good images=SQRT of error percentage in each of the images captured. For example if 3 good images are captured, each achieving 90% identification success, for each image there's a 10% chance of error. Thus, the effective error is 1%.

FIG. 4*e* depicts the final result (FTC) 90 after activating integration process on all target codes shown in FIG. 4*a-d*.

The integration process includes the following steps:
i. Comparison of all target code results generated from a certain image with those generating from other images of the same target code 10. For example if in one image the first character was identified as the number 8 while in others it was identified as the letter B the final result will show B as the first character.
ii. Each character in the target code receives a mark according to the relative accuracy of identification. As In the example given above if the number 8 has a final mark of 40% while the letter B has a final mark of 90% the letter B will be shown in the final code identification results (FTC 90).
iii. The integration process also includes comparison of data generated with pre set data from the program database file. If, for example, the first character in the target code was identified as the number 1, and according to the data in the program file the first character is always the letter I, the letter I will be chosen and will be shown in the final code identification results (FTC 90).

FIG. 5 illustrates an exemplary embodiment of Image capturing unit 110 from the side and from the front.

Image capturing unit 110 includes the following parts: camera 112, illumination unit 115, camera memory card 113 and illumination card 117.

In the following example the illumination and photography compartments are combined, other identification systems exist in which the two are mounted on separate devices as in the port chassis identification system(TCCRS) where extra strong illumination is required.

The type of camera 112 mounting device is determined according to the camera in use. The camera system is designed according to the specific client and location requirements. The illumination memory card 117 features four different illumination levels—low, medium, high and illumination off level.

Camera card 117 is connected to illumination card 114, this fact enables solid-state illumination output to be synchronized to the camera scan exposure time. This method increases the signal to noise ratio, since energy is used only when the exact iris opens. Illumination unit 115 is turned off most of the time, and activated only when the camera unit is activated. This means that the illumination unit is activated only for the duration of fractions of a second depending on the speed of the camera, the energy required for illumination this way is only 15V and 3.3 A. Much energy is saved that way, and lifetime of illumination unit 115 increases and at the same time illumination unit 115 maintenance costs are reduced. In comparison with other systems where a light projector is used and constantly activated during the entire operation, requires 60 A or more energy supply and usually suffers from a short lifetime.

During recognition process 234 camera 112 and illumination 115 units operate in the following way:

Image capturing unit 110 is incessantly activated

When target object 20 enters capture zone 40 recognition application 160 send a command to to frame grabber 132 or/and video servers 130 to save images of target object 20. The command includes all relevant instructions such as the number of pictures required, the degree of illumination and the zoom distance. At the moment of capture, illumination unit 115 provides the necessary illumination level. There are different spectrums used according to target object characteristics, near IR (880 mm) red (660 mm) yellow (590 mm) or other spectrums.

The image capture procedure is repeated until a stop command is received.

In cases when OCRS 100 includes several cameras, each camera receives an independent command and is operated separately with the appropriate illumination and zoom levels.

The different identification systems described here in FIG. 6-14 are all based on OCRS 100 as described above in FIG. 1-5, and all include similar hardware and software compartments. These systems mainly differ in system architecture and configuration in regard to the number of cameras and illumination devices, their position and type of sensors and lens being used. Each system is uniquely designed to meet specific objects identification needs.

With reference to FIG. 6, an exemplary embodiment of a stand-alone Vehicle Access-Control System (VACS) 600 based on OCRS 100 is shown. VACS 600 includes a Compact Car Controller 650( CCC) installed at the entrance to a secured area or parking lot, gate 620, and sensor 640. VACS 600 identifies license plate 610 of a coming car, and automatically opens gate 620 for authorized vehicles 630 without the need for guard. VACS 600 is activated as follows: Sensor 640 (for example a loop detector) indicates the presence of a car 630 and signals CCC 650 to start a new recognition sequence. CCC 650 identifies car 630 and if authorized, opens gate 620.

During Recognition process CCC 650 performs the following steps:
1. captures multiple images (i.e. car 630 front);
2. locates the license plate 610;
3. Identifies the registration number of car 630;
4. compares it to an authorized list(which contains registration number (e.g., "ABC123") and optional owner details (first and last name, e.g. "'Bill Smith")) stored on CCC 650 local database;
5. Opens gate if vehicle 630 is authorized.

Users can change the authorized list using cellular phone, Internet, a micro terminal (keyboard and display), or via an external computer.

In addition CCC 650 can also transmit recognized registration number through RS232 serial line to a printer, a display system, or as an input to external systems.

Figure 7:
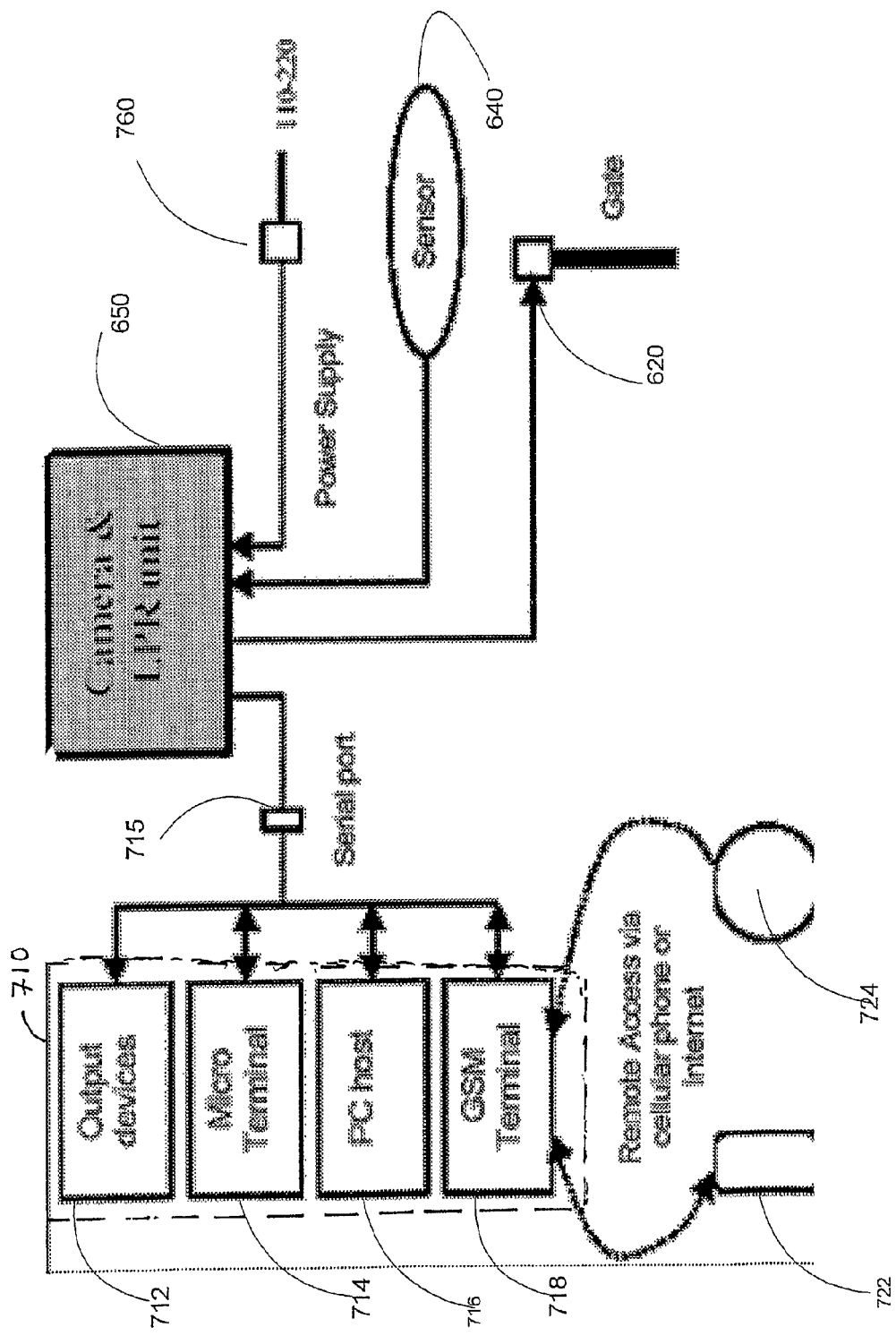
FIG. 7 illustrate a Vehicle Access-Control System architecture according to some embodiment of the present invention.

FIG. 7, illustrates VACS 600 architecture. Peripherals 710 are connected via a single serial port 715 to CCC 650. Peripherals 710 comprise: output devices 712, Micro Terminal 714, PC host 716 and GSM Terminal (Global System for Mobile Communication) 718.

Micro-Terminal 714 is a small hand-held (or wall mounted) ASCII terminal and keypad, for use with CCC 650. Micro-Terminal 714 contains a small display and a small keypad. Micro-Terminal 714 is used for management of authorized vehicles.

Output devices 712 include various devices connected by user to show information about incoming cars. For example outdoor display (displaying a personalized welcome message) or portable serial printer (printing the events).

It is possible to interface the CCC 650 using a PC running Windows (any of the standard operating system), or via network.

Member program supports the interface and enables end-user to perform various function such as: "Add"—add a new member to the list, "Edit"—change the car plate number, "Delete"—delete one member from the list, "Find"—find a member by car code first or last name.

GSM terminals 718 (i.e. M20 Terminal and SMS (Short Messages Service) of GSM network operator) is used for remote interfacing 722, 724 with CCC 718.

CCC 650 comprises: camera 112 and illumination unit 115 (as shown in FIG. 4), OCRS 100 unit (described in FIG. 1-2). CCC 650 is connected to power supply 760, sensor 640 (dry-contact indicating vehicle presence) and gate 620.

VACS system uses a solid-state pulsed LED array to illuminate car plate. The illumination is controlled by recognition application 160, which can set the illumination to 3 levels (after the vehicle triggers the loop detector) or turn it off to save energy (most of the time when there is no vehicle present).

The frame grabber settings 132 (i.e. contrast, brightness, gain) are either predefined and constant, selected by a time—dependent look up table, or automatically selected according to the measured brightness of a previous images—implementing an automatic 'software' iris.

As mentioned above, standard installation is based on the assumptions that reflective car plates are needed to be identified. Thus, near infra-red (IR) illumination is used. For countries (such as Korea and Brazil) where non-reflective car plates are used a visible illumination is activated. Additional special cases include some US states and Mexico where non-standard reflective plates also require a visible illumination.

Figure 8:
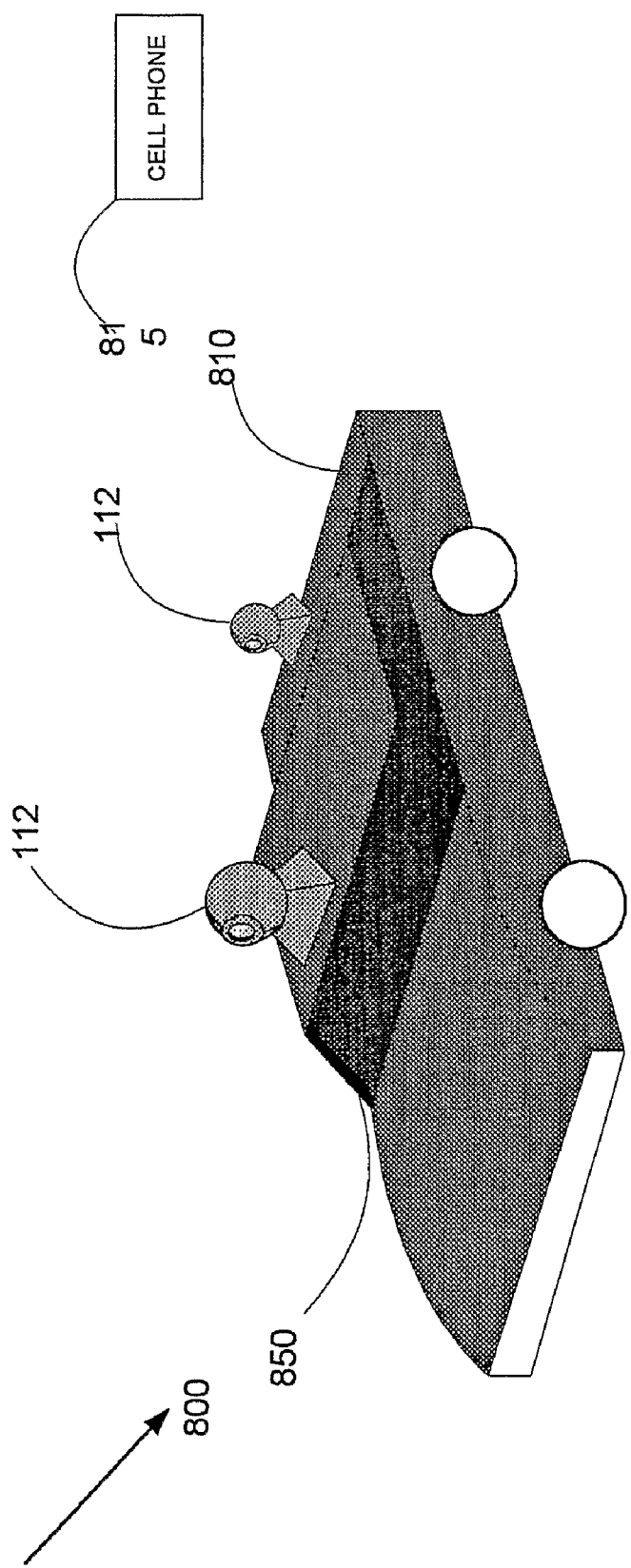
FIG. 8 shows a Searching and Processing System according to some embodiment of the present invention.

With reference to FIG. 8, there is shown an exemplary embodiment of a Image Searching and Processing System (ISPS) 800 that tracks car's plates, reads and identifies their numbers.

The system is mounted permanently on the roof and on the back of ISPS vehicle 850, which rides along the road and automatically scans parking or passing car plates.

The identified number is displayed on the system display 810, and can be transferred to other Windows applications (via DDE message) or transmitted to Wireless LAN, and personal cell phones 815.

Cameras 112 are mounted to capture one of the following primary situations:
Parallel parking cars—that are parking in parallel to the road (along the sidewalk or along the road side).
Perpendicular parking cars—cars that are parking on a square angle to the side of the road.
Diagonally parking cars—cars that are parking in an angle to the side of another car.
Passing cars—cars that pass the recognition vehicle on the side.

Although the standard recognition vehicle configuration includes dual cameras, there are other recognition vehicle configurations, which include a single camera or triple cameras (two side cameras and one back camera).

ISPS 800 constantly toggles, at a high speed rate, between cameras 112 in order to detect the plates from one (or more) of the cameras. The number of cameras determines the number of total views ISPS 800 receives. The chances of achieving accurate identification grows if more images are received, but too many images will slow the operation down and will cause delays in the identification vehicle movement, forcing it to slow down.

Figure 9A:
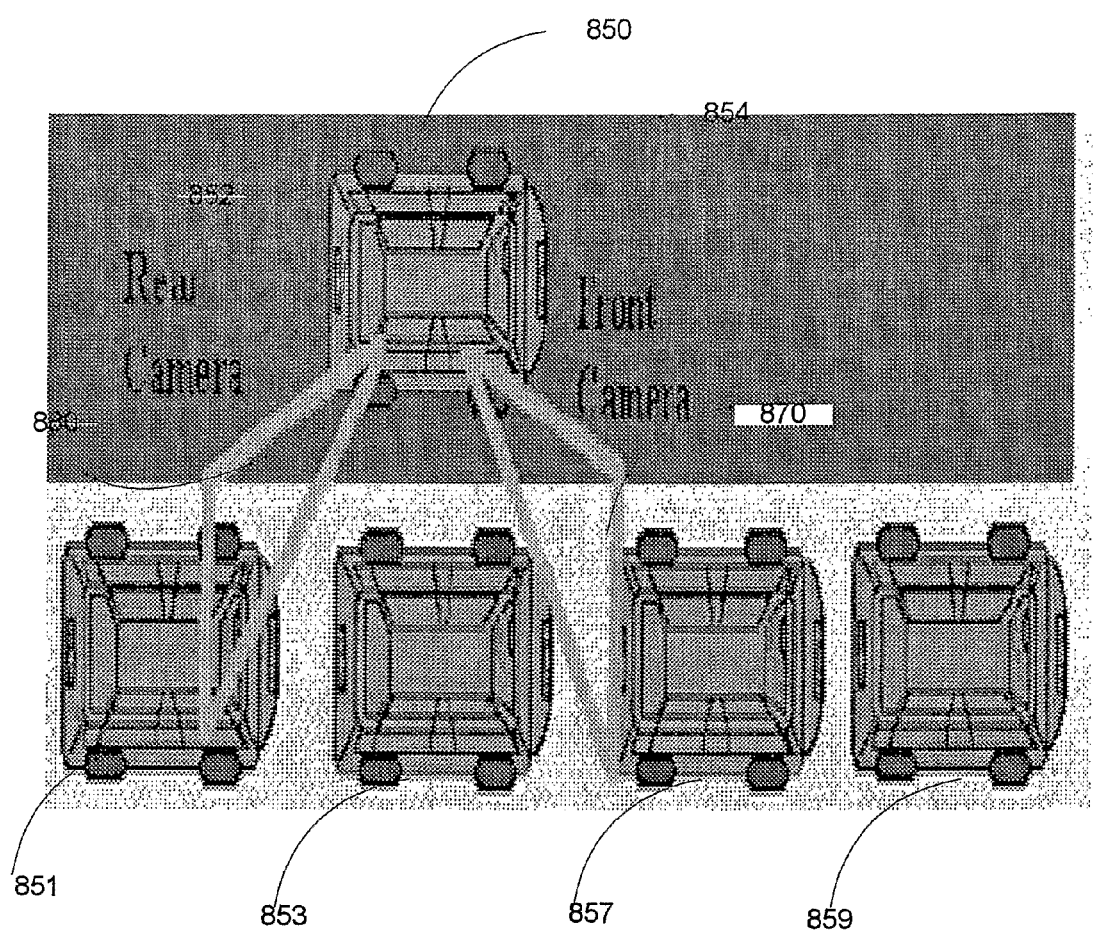
FIG. 9a shows an ISPS vehicle according to some embodiment of the present invention.

FIG. 9a shows an example of ISPS vehicle 850 with two cameras (front camera 854 and rear camera 852) mounted on its roof. Front camera 852 will detect incoming cars (cars 857 and 859) which are in field of view 870, while rear camera 852 will detect plates of outgoing cars (car 851) which are in field of view 880. Thus, each car is scanned twice by front and rear cameras 854 and 852, which increases the detection capability.

Figure 9B:
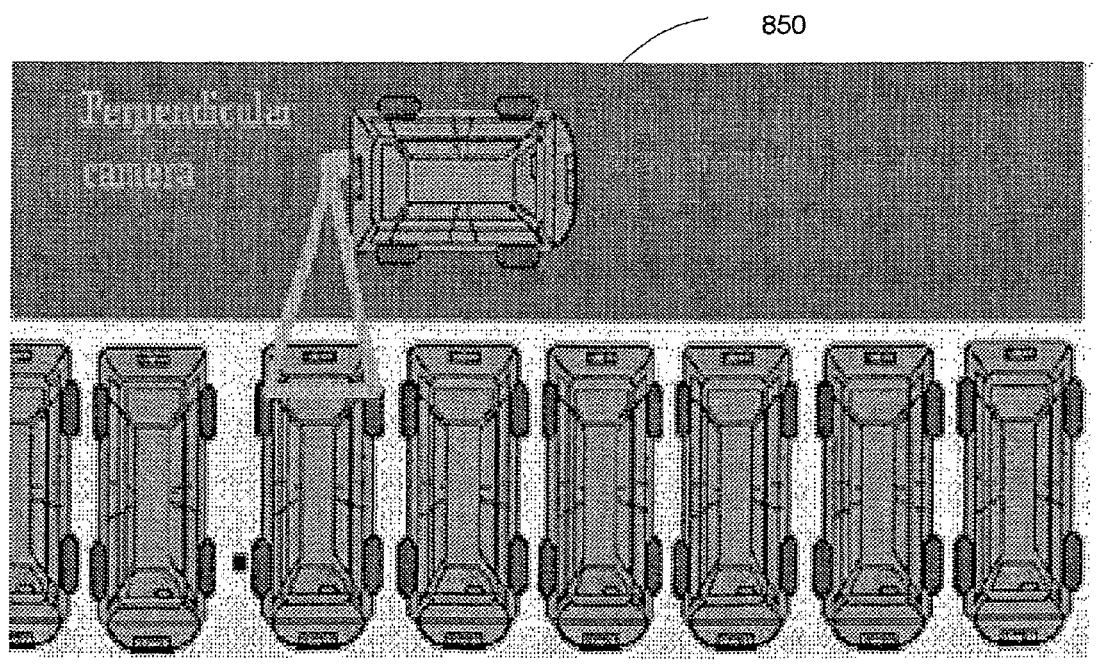
FIG. 9b shows an exemplary embodiment of single camera ISPS vehicle.

FIG. 9b Illustrates an ISPS vehicle 850 with a single camera mounted on its back bumper. The identification vehicle has only one field of view that can scan either passing fronts or rears of parking cars.

Unlike the systems described above ISPS 800 operates without pause, searching for license plates and reporting finds constantly rather than shutting down between vehicles.

Figure 10A:
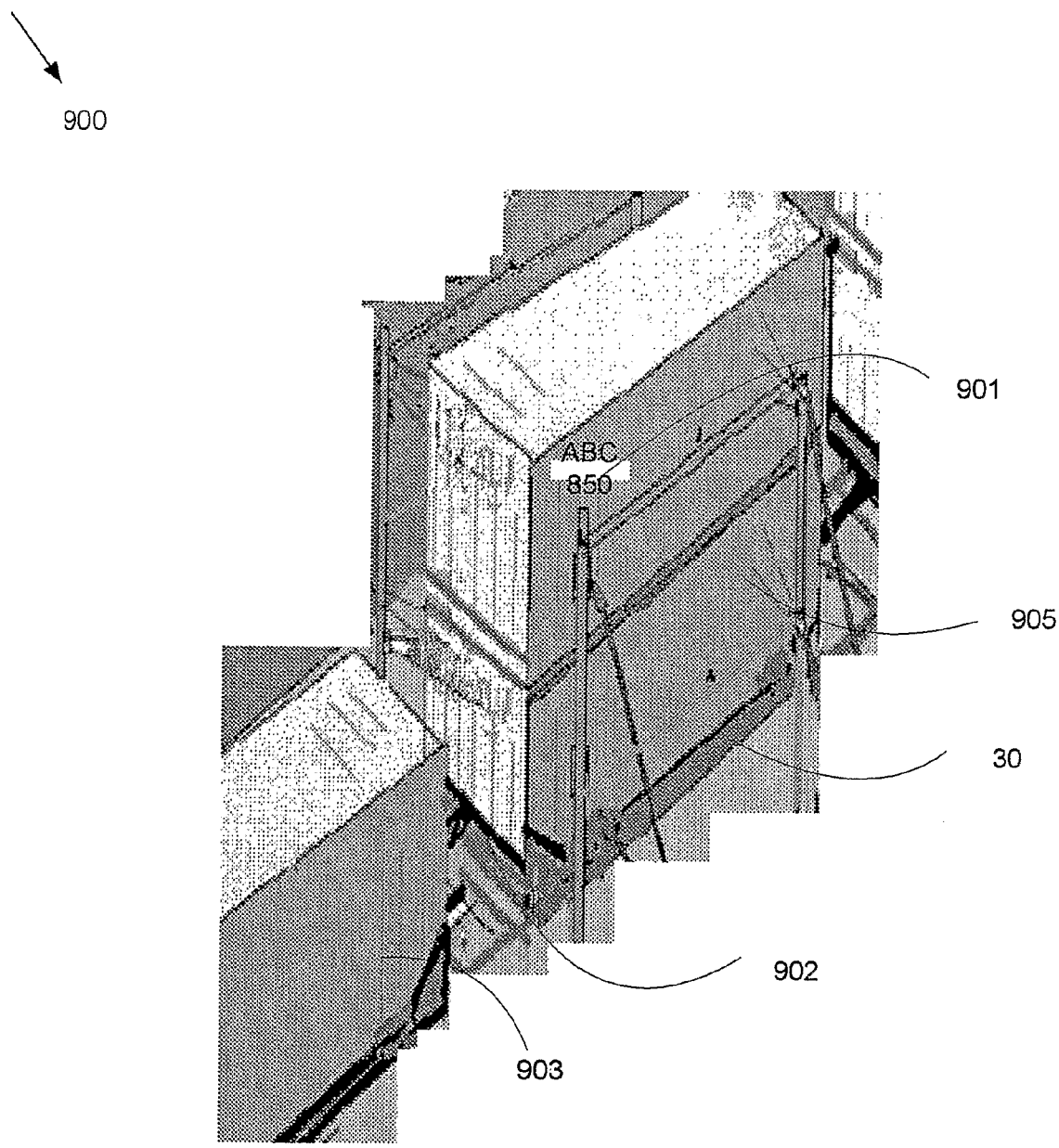
FIG. 10a, shows an exemplary embodiment of a container code recognition system.

With reference to FIG. 10a, an exemplary embodiment of a container code recognition system for identifying containers on rail cars TOCRS 900 (train optical container recognition system) is shown.

TOCRS 900 tracks and reads Container identification numbers that are carried by a train in a port installation. Each TRCS 900 controls a single rail track, with trains moving at either direction. TRCS 900 detects a single level of containers. Each level includes a single or double container-or no container at all.

The identified numbers are displayed on TRCS display, and transferred to other Windows application (with DDE messages), or via the network. The image files could be also saved on disk.

When moving train and the containers that it carries enter detection zone, sensors are activated and signal to TRCS program, via IO card, that the container is present. TRCS program starts the recognition process: a sequence of images in different illumination levels are captured according to sensors (as was described in FIG. 1-2).

Figure 10B:
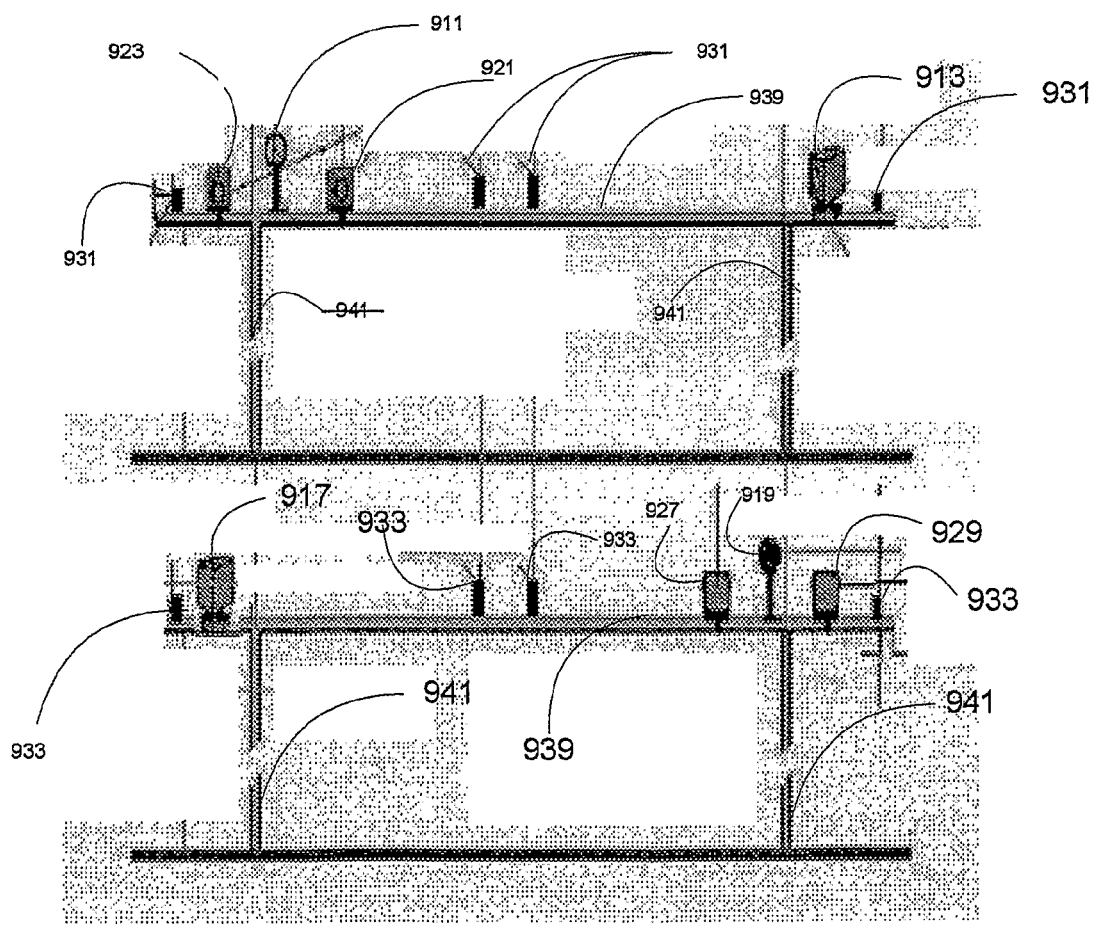
FIG. 10b shows a top view of a camera configuration according to some embodiment of the present invention.

FIG. 10*b* shows a top view of camera configuration 910 according to TRCS 900.

Cameras 911, 913, 917 and 919 are located at 4 corners. Side cameras 911 and 919 take images of the side marking of container, while back cameras 913 and 917 take images of the back/front of container.

Camera 911 is connected to illumination units 921, and 923 and camera 919 is connected to illumination unit 927 and 929. Four sensors 931 are located at the right side of the trail and four sensors 933 are located at the left side of the trail.

The cameras, illumination and sensors units are mounted on two horizontal pipes 937, and 939. Each horizontal pipe 937,939 stand on two vertical poles 941 which are reinforced to the ground to prevent any effect from passing containers.

TRCS 900 comprises the same software and hardware which were mentioned in FIG. 1-2, and it is optimized for identifying railway containers.

TRCS 900 operates recognition process 234 as was described in FIG. 2. According to TRCS 900 recognition process, target object 20 is defined as container, and the target code 10 is defined as container identification number.

The operation of the TRCS 900 is activated according to the following steps:
1) when moving train and containers that it carries enter detection zone, the sensors are activated;
2) Sensor signal to program via IO card that the container is present;
3) Recognition application starts recognition process 234 which includes the following steps;
    i) a sequence of images in different illumination levels are captured according to the sensors and predefined sequence (the illumination level is controlled by 10 card.
    ii) Images are sent to recognition application for container marking identification.
    iii) Identification results are sent to recognition application database.
4) a single message is generated for each passing container. The message includes recognition results, which contain container ID number, and additional information (such as track/lane number date and time).
5) Message is sent to client application where the message is displayed (Additional client application could also use the message).
6) A windows mechanism (such as DDE Share or DCOM) can also spread the message through the network to remote Central processors and databases (in the case of DDE, DDE client application is provided as source file for simplified integration into other applications.
7) Steps 3, 4 are repeated as the train is passing. If the train backs up and forth, additional messages are generated.

Figure 11A:
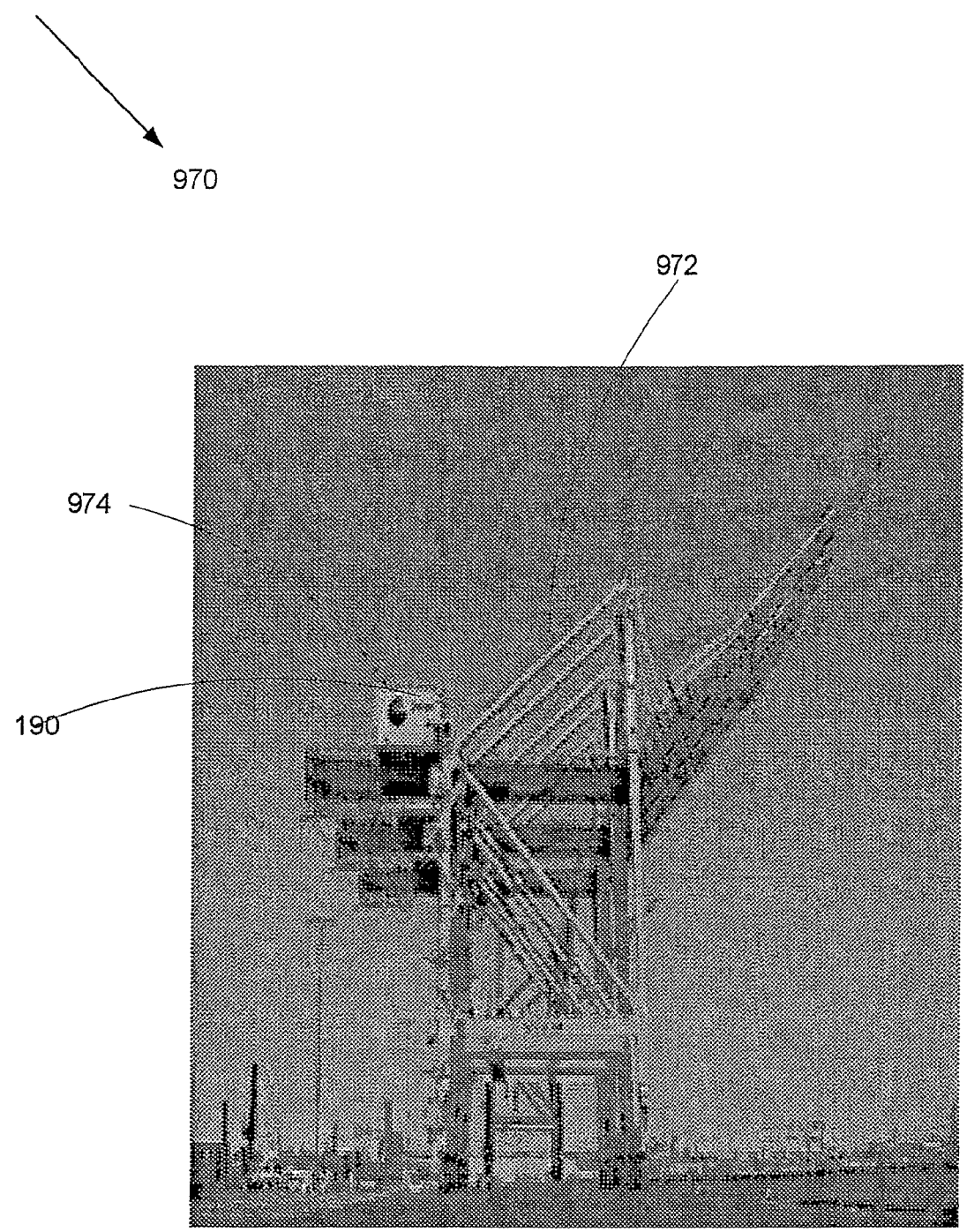
FIG. 11, an exemplary embodiment of a Quay Crane Recognition System.

With reference to FIG. 11*a*, an exemplary embodiment of a Quay Crane Recognition System (QCRS) 970 for identifying containers on quay crane is shown.

QCRS 970 tracks and reads Container identification numbers, handled

By quay crane. Quay crane 972 is a machine that loads or unloads containers on a ship to/from trucks on pier. QCRS 970 handles various container configuration (20,40,45, 20/20 pairs).

QCRS 970 comprises PC 190, installed in crane controller equipment room 974, an array of 6 cameras 975-980 and illumination units mounted on land side and sea side of the crane.

Figure 11B:
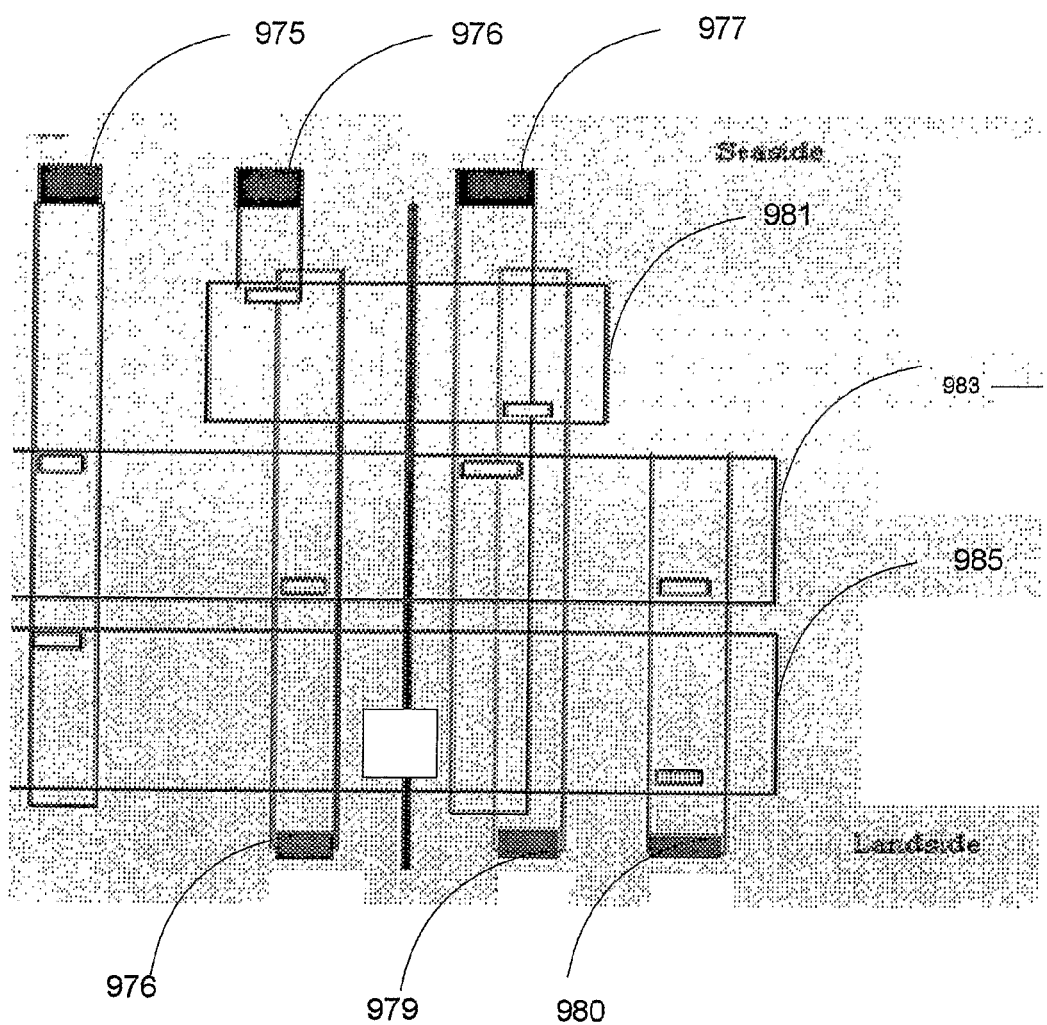

As shown in FIG. 11*b*, QCRS 970 reads the images from 2 to 4 different cameras, simultaneously, depending on the type of container that needs to be identified:
Container 981—cameras 979 and 976 are used.
Container 983—cameras 976, 980,977 and 975 are used.
Container 985—cameras 980 and 975 are used.

QCRS 970 recognition process is similar to that described in FIG. 1,2. Recognition process 200 is performed once the crate has left the image capture zone(in this case target object defined as container, and target code 10 defined as container I.D ).

Figure 12:
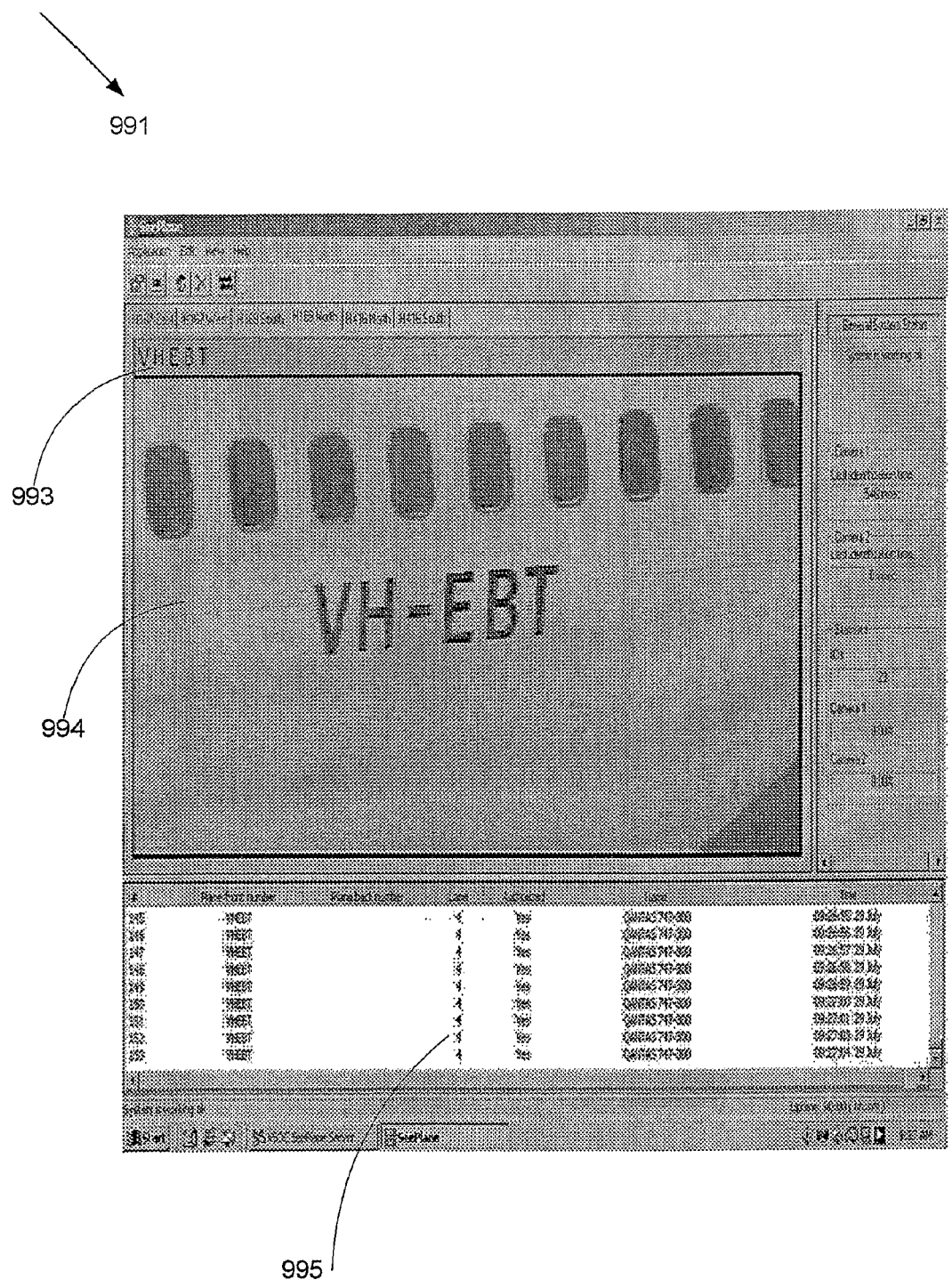
FIG. 12 shows a screen shot of a multi lane plane recognition system according to some embodiment of the present invention.

With reference to FIG. 12, a screen shot 991 of an exemplary embodiment of a multi lane plane recognition system (PRS) 990, shows a sample capture of an aircraft.

Recognition of identification marking (VH-EBT) 993 is displayed above plane image 994. History 995 of previous recognitions is displayed below plane image 994.

PRS 991 is designed to identify standard fixed-wing aircraft marking that appear on the vertical tail surface or the sides of the fuselage. PRS 990 sends the recognition results (i.e. plane marking, image file path, lane number, date and time) to client application.

PRS 990 includes both hardware and software (as described in FIG. 1-5 ) and can accommodate up to six separate lens per system.

Apart from the different usage of identification systems as described in FIG. 6-12, several monitor modules exist for each unique system design, which serve as support to different OCRS 100 (i.e. VACS, ISPS, TOCRS QCRS and PRS).

Monitor module is especially designed to handle multiple applications such as VACS QCRS connected via the network. Monitor module is usually installed on one or more central servers, or on one of the identification system PCs.

The objectives of Monitor utility are:
1. Monitoring the status of OCRS 100.
2. summarizing the operation of OCRS 100 graphically.
3. enabling quick access to event log.
4. reporting of OCRS 100 status to external management systems.

Figure 13A:
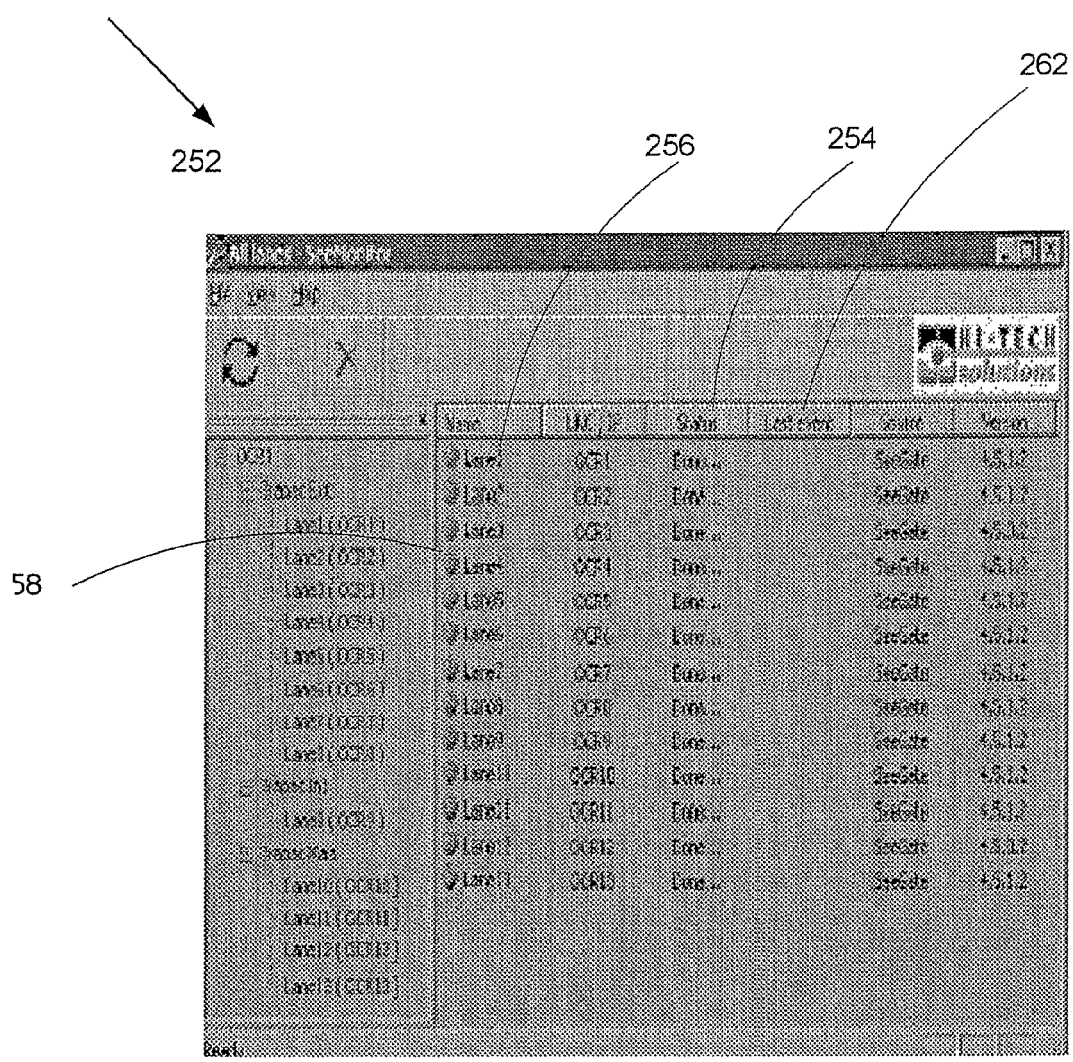
FIGS. 13a-b show two screen shots of an exemplary embodiment of a Monitor module.

With reference to FIG. 13*a*, a screen shot 252 of an exemplary embodiment of a Monitor module 250 main display shows status 254 of 14 lanes 256 in a OCRS 100 array. The status 254 of each lane is indicated by different status lights 258 red=error, yellow=warning and green=normal. (In FIG. 13*a* all 14 lanes are indicate normal status i.e green).

Additional information may also be overviewed by monitor modules 250 such as event log 262 for each lane.

Figure 13B:
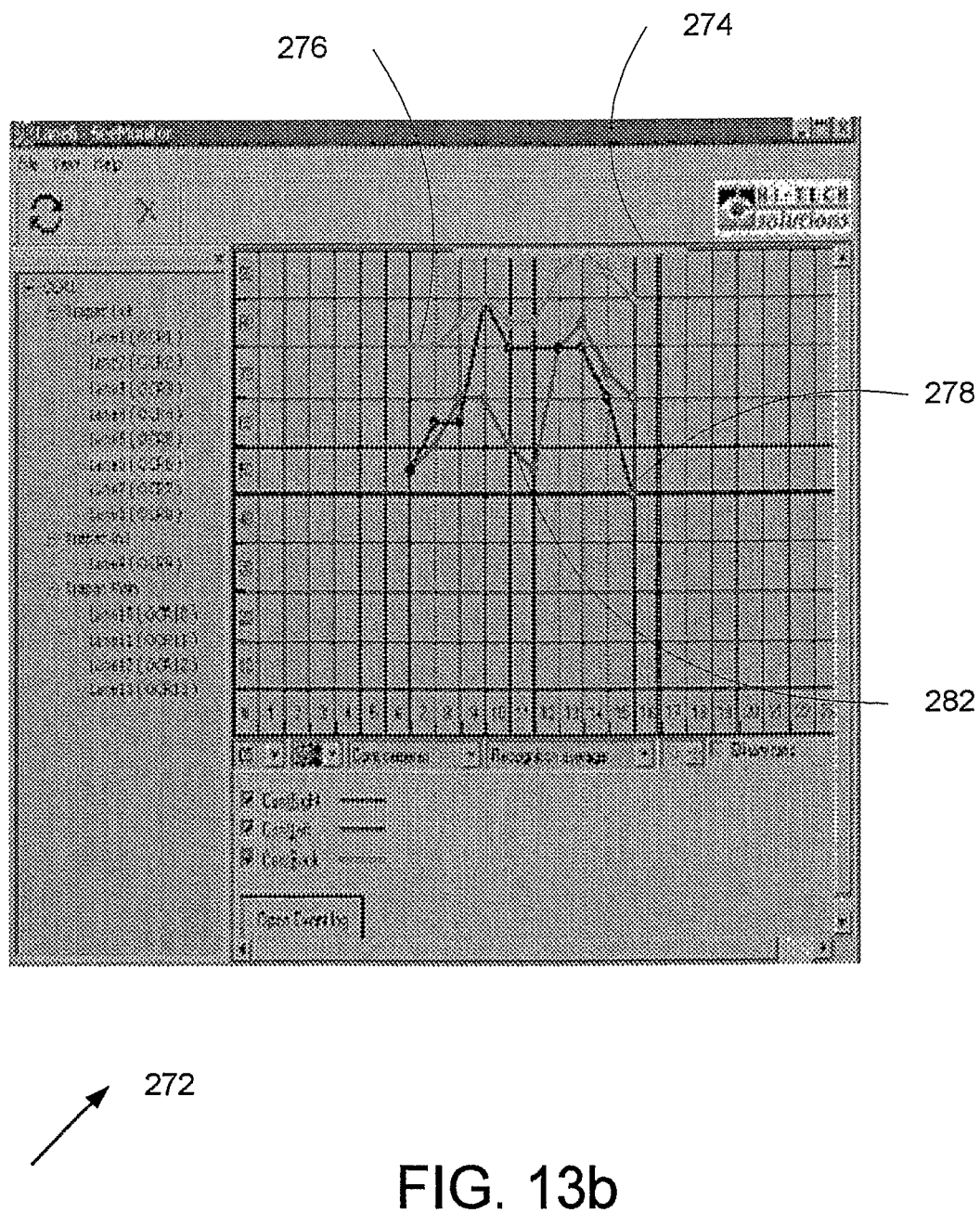

With reference to FIG. 13*b*, a screen shot 272 of an exemplary embodiment of an Monitor module 250 shows four recognition rate graphs 274, 276, 278 and 282.

Recognition rate graph 274 describes a summary of a daily recognition percentage for every camera in each lane.

Recognition percentage is defined as the number of events with 'good' recognition, divided by the total number of recognition events.

'good' recognition means that recognition system output any result i.e. a good indication of the quality of camera.

As shown in FIG. 13*b*, recognition graph describes lane 6 recognition percentage verses time.

Graph 274 shows overall recognition rate (all line 6 cameras) during the entire day (100%) .

graph 276—shows recognition rate of back container camera (80-100%).

Graph 278—shows right side camera recognition rate (55-85%).

Graph 282—shows left container camera recognition rate (50-90%).

Figure 14A:
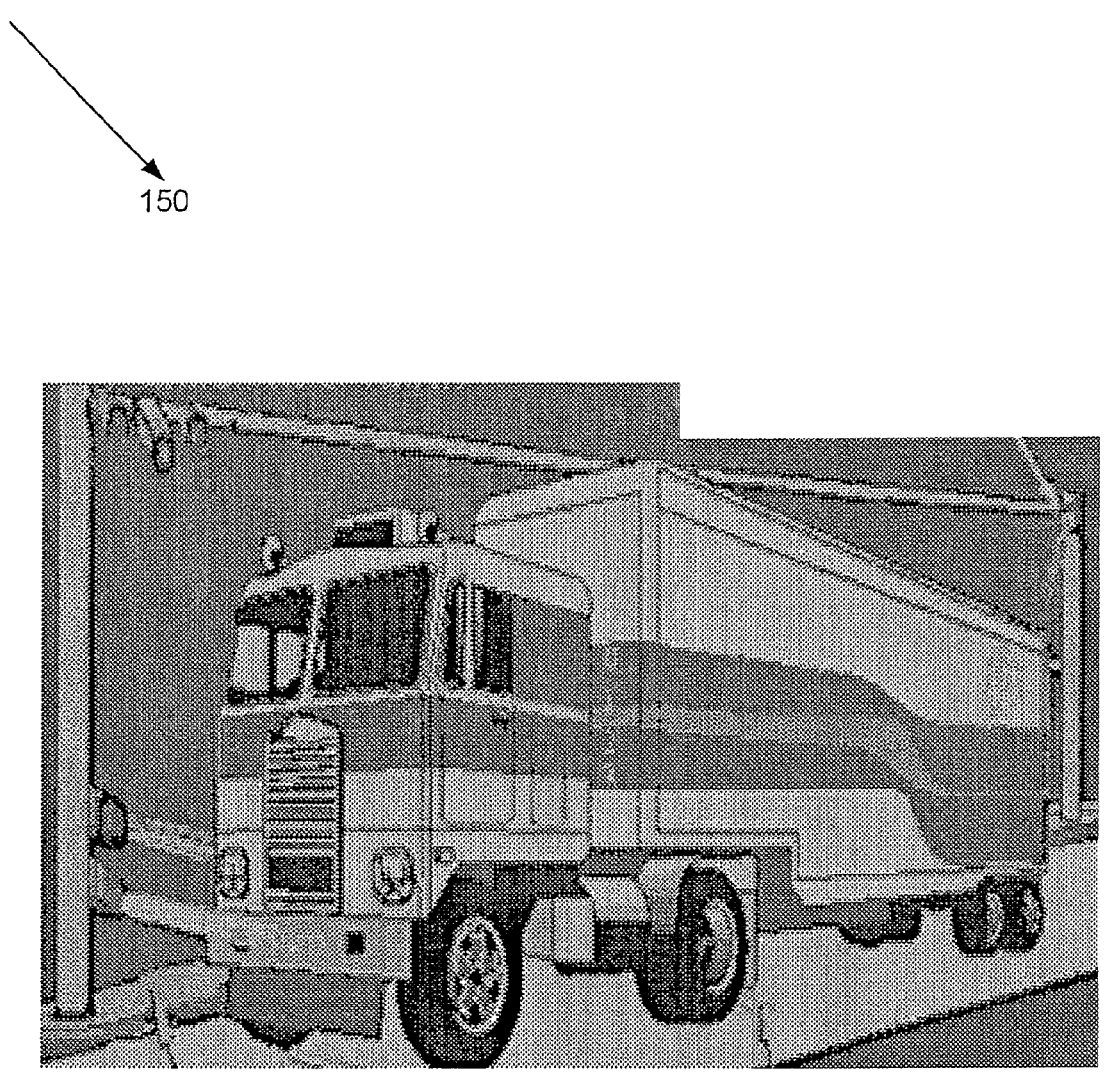
FIG. 14a, show an exemplary embodiment of a truck and container code recognition system.

With reference to FIG. 14a, an exemplary embodiment of a truck and container code recognition system 150 (TCCRS) is shown. TCCRS 150, correspondingly and automatically identifies: shipping containers identification number on carrying truck, carrying truck license and wagon/chassis number plate, while the truck and containers are in motion.

The identified numbers are displayed on TCCRS display, and transferred to other Windows application (with DDE messages), or via the network (with DDE share networking option). The image files could be also saved on disk.

When moving truck and the containers that it carries enter detection zone, sensors are activated and signal to the TCCRS program, via IO card, that the container is present. TCCRS program starts the recognition process: a sequence of images in different illumination levels are captured according to sensors (as was described in FIG. 1-2).

Figure 14B:
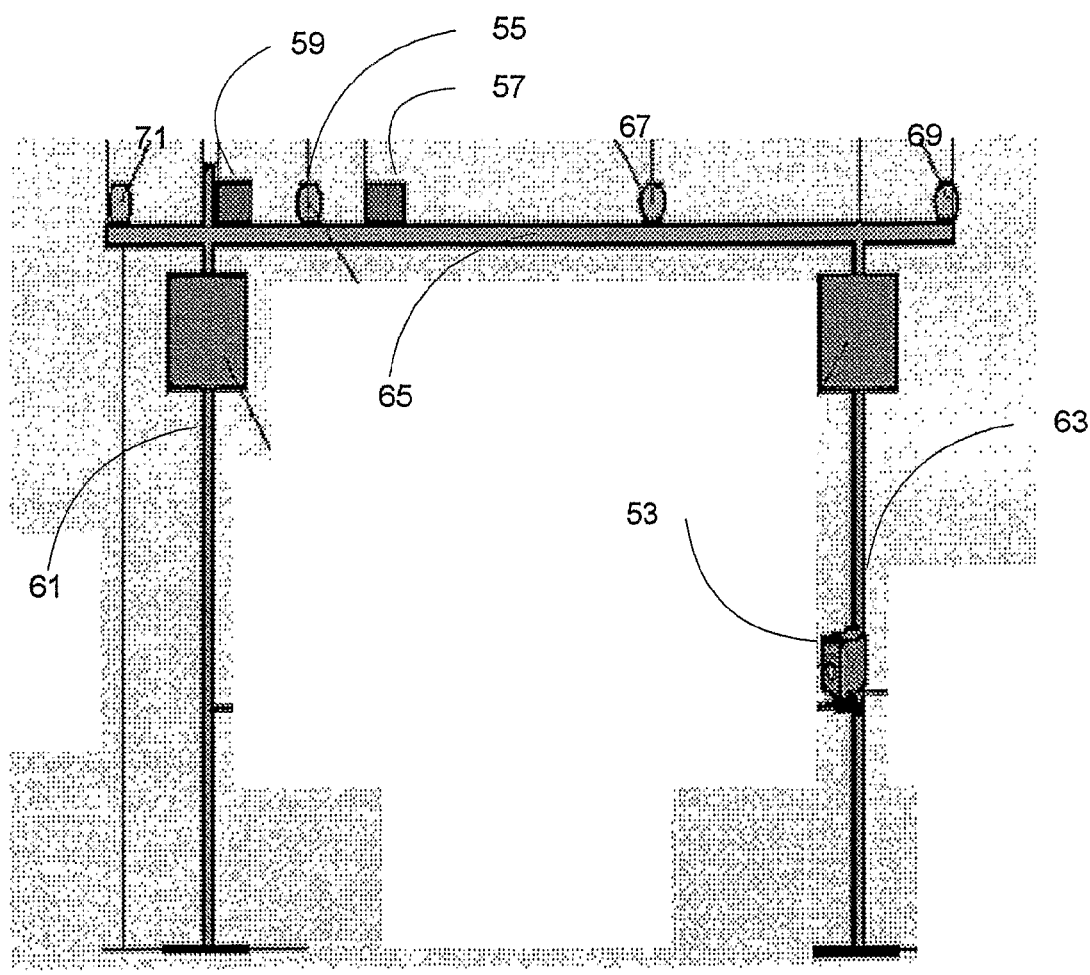
FIGS. 14b and 14c shows a top view of camera configuration according to a truck and container code recognition system.
Figure 14C:
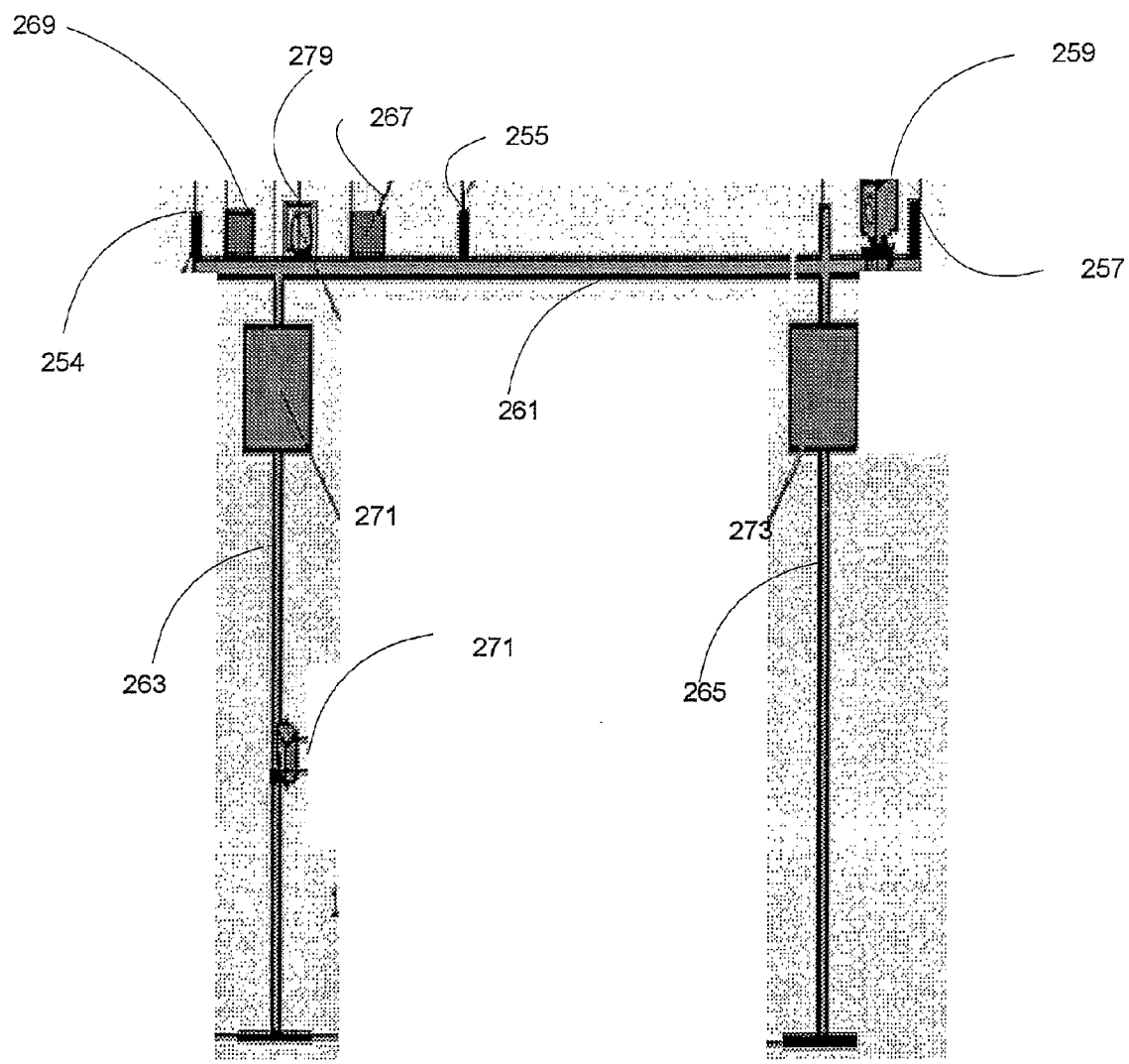

FIG. 14b and 14c shows a top view of left and right TCCRS 150 equipment configuration.

TCCRS 150 left side shown in FIG. 14b includes: camera 51 mounted on vertical pole 61 and, camera 53 mounted on vertical pole 63. Connection boxes, which include all needed power supply, are mounted on vertical poles 61, 63 and are connected to ground wire conduits. Cameras 55, mounted on horizontal pipe 65, are connected to illumination units 57 and 59 and to reflectors 67, 69 and 71. Camera 55 takes images of the side marking of container, while cameras 51 and camera 53 take images of chassis and truck identification number.

TCCRS right side, shown in FIG. 14c includes: camera 251 mounted on vertical pole 263 and, camera 253 mounted on vertical pole 265. Connection boxes 271, 273, are mounted on vertical poles 61, 63 and are connected to ground wire conduits. Cameras 279 and 259, mounted on horizontal pipe 261, and are connected to illumination units 267 and 269 and to sensors 254, 255 and 257. Cameras 279 and 259 take right images of the side marking of container, while camera 251 and 253 take images of chassis and truck identification number.

TCCRS 150 comprises the same software and hardware which were mentioned in FIG. 1-2, and it is optimized for identifying truck containers and truck license and wagon/chassis number plate.

TCCRS 150 operates recognition process 234 as was described in FIG. 2. According to TCCRS recognition process, target object 20 is defined as container, and the target code 10 is defined as container identification number and truck license and wagon/chassis number plate.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

What is claimed is:

1. A method for recognizing characters, comprising:
    initially receiving updates at a recognition application prior to a first capturing step, the updates having pre set data relevant to identifying a target code, the target code comprising one or more characters, each of the characters having a relative position within the target code;
    receiving at a processing unit a signal from a sensor, the signal being sent in response to an entry of a target object into a capture zone;
    capturing a plurality of images with one or more cameras in response to receipt of the signal;
    receiving the plurality of images at the recognition application;
    selecting one or more areas within one or more of the plurality of images that are likely to contain the target code;
    identifying the target code within the one or more areas using the recognition application;
    marking a character from the target code according to a relative identification accuracy of the character, the marked character having a first relative position within the target code;
    comparing the marked character with a plurality of characters contained within the pre set data relevant to identifying the target code, each of the plurality of characters having a relative position comparable to the first relative position,; and
    selecting an accurate identification result for the marked character based on the comparably positioned characters from within the pre set data.

2. The method of claim 1, further comprising: receiving a focus command at at least one of the one or more cameras in response to the entry of the target object into the capture zone.

3. The method of claim 1, further comprising: receiving a zoom command at at least one of the one or more cameras in response to the entry of the target object into the capture zone.

4. The method of claim 1, further comprising: receiving an activate illumination command at an illumination unit in response to the entry of the target object into the capture zone.

5. The method of claim 4, wherein the illumination unit is synchronized with at least one of the one or more cameras.

6. The method of claim 1, wherein each of the one or more cameras are positioned at different angles.

7. The method of claim 1, wherein the capturing step further comprises: capturing the plurality of images under a plurality of lighting conditions, the lighting conditions provided by one or more illumination units.

8. The method of claim 1, wherein the capturing step is repeated until a stop command is received.

9. The method of claim 1, wherein the identifying step further comprises: adjusting and improving the selected area(s) one or more areas using a high pass filtering function.

10. The method of claim 1, further comprising: displaying an identified code on a display.

11. The method of claim 1, further comprising: comparing one or more target code result(s) generated from one image with one or more target code result(s) generated from another image.

12. The method of claim 1, further comprising: operating a consequent action in response to the selecting an accurate identification result step.

13. The method of claim 1, further comprising: creating one or more databases of relative data.

14. The method of claim 1, further comprising: subsequent to the selecting an accurate identification result step, verifying a reliability of a resulting target code.

15. The method of claim 1, further comprising: receiving a Final Target Code (FTC).

16. The method of claim 15, wherein the FTC is stored as a data message.

17. The method of claim 16, wherein the data message is shared across a network.

18. A character recognition system comprising:
    an image capturing unit comprising a camera configured to capture a plurality of images containing an alphanumeric target code, the alphanumeric target code comprising one or more characters, each of the characters having a relative position within the target code;
    an I/O card;
    a memory that includes a set of stored target codes;

a processing unit in communication with the I/O card and the memory and comprising a recognition application executing therein which is in communication with the camera; and a sensor in communication with the I/O card and configured to send a signal to the processing unit via the I/O card in response to an entry of a code into a sensor field;

wherein the recognition application initially receives, prior to a first capture of the pluality of images, updates of pre set data that are relevant to identifying the target code, wherein at least one of the recognition application and the processing unit is configured, in response to receipt of the signal, to:

receive the plurality of images from the camera; and select one or more areas within one or more of the plurality of images that are likely to contain the alphanumeric target code;

identify the alphanumeric target code contained within the one or more areas;

compare the identified target code with the set of stored target codes included in the memory;

mark a character within the identified target code according to a relative identification accuracy of the character, the marked character having a first relative position within the target code;

compare the marked character with a plurality of characters contained within the pre set data that are relevant to identifying the target code, each of the plurality of characters having a relative position comparable to the first relative position, select an identification for the marked character based on the comparably positioned characters from within the pre set data, and generate a final code identification result.

19. The system of claim 18, wherein the image capturing unit further comprises: a plurality of cameras.

20. The system of claim 19, wherein the cameras are positioned at different angles.

21. The system of claim 19, wherein the processing unit toggles between the plurality of cameras.

22. The system of claim 18, further comprising an illumination unit in communication with the recognition application.

23. The system of claim 22, wherein the illumination unit is synchronized with the camera.

24. The system of claim 18, wherein the processing unit further comprises: a video server unit.

25. The system of claim 18, wherein the processing unit further comprises: a frame grabber.

26. The system of claim 18, wherein the processing unit further comprises a management program.

27. The system of claim 26, wherein the management program saves and transfers identified codes to a client application.

28. The system of claim 18, further comprising a display device in communication with the I/O card for displaying information.

29. The method of claim 1, further comprising: displaying a history of one or more previous recognitions.

30. The method of claim 1, further comprising: providing a recognition percentage of each of the one or more cameras.

31. The method of claim 1, further comprising: prior to the receiving the plurality of images at the recognition application step, determining that the target object has left the capture zone.

32. The method of claim 1, wherein the receiving the plurality of images at the recognition application, identifying, marking, comparing, and selecting steps occur subsequent to a departure of the target object from the capture zone.

33. The method of claim 1, further comprising separating the marked character from other characters in the target code.

34. The method of claim 1, wherein the step of receiving at a processing unit a signal from a sensor comprises: receiving at a processing unit a signal from a sensor, the signal being sent in response to an entry of an object bearing an alphanumeric code requiring identification into a capture zone.

* * * * *